US005790120A

United States Patent [19]

Lozares et al.

[11] Patent Number: 5,790,120

[45] Date of Patent: *Aug. 4, 1998

[54] INDIVIDUALLY CONFIGURABLE PANEL USER INTERFACE WITH SELECTIVE LAUNCHING, STICKY WINDOWS, HOT KEYS, START UP OPTIONS AND CONFIGURABLE BACKGROUND

[75] Inventors: Lawrence Lozares, Sunnyvale; George A. Hansen, Walnut Creek, both of Calif.

[73] Assignee: Starfish Software, Inc., Scotts Valley, Calif.

[ * ] Notice: The term of this patent shall not extend beyond the expiration date of Pat. No. 5,602,997.

[21] Appl. No.: 713,982

[22] Filed: Sep. 12, 1996

Related U.S. Application Data

[63] Continuation of Ser. No. 85,538, Jun. 30, 1993, abandoned, which is a continuation-in-part of Ser. No. 936,692, Aug. 27, 1992, abandoned.

[51] Int. Cl.$^{6}$ .................... G06F 17/60

[52] U.S. Cl. .................... 345/349

[58] Field of Search .................... 395/333, 339–346; 345/349

[56] References Cited

U.S. PATENT DOCUMENTS

| | | | |
|---|---|---|---|
| 5,046,001 | 9/1991 | Barker et al. | 345/345 |
| 5,050,105 | 9/1991 | Peters | 345/340 |
| 5,140,677 | 8/1992 | Fleming et al. | 345/348 |
| 5,276,816 | 1/1994 | Cavendish et al. | 345/348 |
| 5,307,456 | 4/1994 | MacKay | 345/328 |
| 5,335,320 | 8/1994 | Iwata et al. | 395/704 |
| 5,339,391 | 8/1994 | Wroblewski et al. | 345/341 |
| 5,347,628 | 9/1994 | Brewer et al. | 345/351 |
| 5,349,658 | 9/1994 | O'Rourke et al. | 345/349 |

OTHER PUBLICATIONS

Microsoft, Windows 3.1 User Guide, 1991, pp. 5–89, 148–151, 448–451.

Webster, The Next Book, 1989, pp. 112–113, 118–139, 162–205, 286–319.

Amish Utilities User's Guide, Amish Software, Inc., 541 Cowper Street, Suite A, Palo Alto, CA 94301, 1992, pp. 19–24.

WinMaster User's Guide, PC–Kwik Corporation,15100 SW Koll Parkway, Beaverton, OR 97006, pp. 28–49.

Rooms for Windows from XSoft User Guide, Xerox Corporation, 3400 Hillview Avenue, Palo Alto, California 94303, Mar. 1, 1992, pp. 18–42.

Wide Angle, Attitash Software, Inc., 20 Trafalgar Square, Nashua, New Hampshire 03063, pp. 3–1–4–13.

Using Norton Desktop for Windows, Symantec, pp. 18–3–18–7.

HOTWin Version 2.0A, Abacist Software Company, 1992, pp. 4–1–5–1.

*Primary Examiner*—Anton Fetting

*Attorney, Agent, or Firm*—John A. Smart

[57] ABSTRACT

A user interface has a mini-program window display means, a launch selection area display means and an activating means. The mini-program window display means displays a plurality of mini-program windows within a first panel interface. Each mini-program window has a first background pattern. Each mini-program window represents a virtual computing screen. Mini-windows shown in the mini-program windows each represent an application window displayed in the represented virtual computing screen. The launch selection area display means displays a plurality of application launch selection areas within a second panel interface. The activating means activates an application process associated with a first application launch selection area in a first virtual computing screen represented by a first mini-program window in response to a user indicating a selection of the first application launch selection area from the application launch selection areas and the selection of the first mini-program window from the plurality of mini-program windows.

38 Claims, 22 Drawing Sheets

INDIVIDUALLY CONFIGURABLE PANEL USER INTERFACE WITH SELECTIVE LAUNCHING, STICKY WINDOWS, HOT KEYS, START UP OPTIONS AND CONFIGURABLE BACKGROUND

CROSS REFERENCE TO RELATED APPLICATION

The present application is a continuation of application Ser. No. 08/085,538, filed Jun. 30, 1993 and now abandoned, which is a continuation-in-part of application Ser. No. 07/936,692, filed Aug. 27, 1992 and now abandoned.

BACKGROUND

The present invention concerns a user interface with individually configurable panel interfaces for use in a computer system.

In a computer systems such as personal computers, there is a continual search to provide a user simple and intuitive interfaces to computer applications and resources. For example, many personal computers use the Microsoft Windows operating system, available from Microsoft Corporation having a business address of One Microsoft Way, Redmond, Wash. 98052.

Various utilities have been designed to run with the Microsoft Windows operating system. These include, for example, Amish Utilities available from Amish Software, Inc., having a business address of 541 Cowper Street, Suite A, Palo Alto, Calif. 94301, the KwikInfo utility available from PC-Kwik Corporation having a business address of 15100 SW Koll Parkway, Beaverton, Oreg. 97006, the PowerLauncher utility available from hDC Computer Corporation, having a business address of 6742 185th Ave NE, Redmond Wash. 98052, the SideBar utility available from Paper Software, Inc., having a business address of P.O. Box 567 New Paltz, N.Y. 12561, the Rooms for Windows utility available from Xerox Corporation, XSoft Production Education, having a business address of 3400 Hillview Avenue, Palo Alto, Calif. 94303, the Wide Angle utility available from Attitash, having a business address of 20 Trafalgar Square, Nashua, N.H. 03063, the Squeegee utility available from ICOM Simulations, Inc., having a business address of 648, S. Wheeling Road, Wheeling, Ill. 60090, the SYSTEM INFO utility available from Symantec, as part of the Norton Desktop for Windows, and the Gallery View utility available from Abadst Software Company. The above described utilities variously implement functionality for launching programs, printing, viewing screens and showing virtual screens.

SUMMARY OF THE INVENTION

In accordance with the preferred embodiment of the present invention, a user interface is presented. The user interface has a main module and a plurality of panel modules. The main module presents a user interface shell on the display screen to a user. The plurality of panel modules are in communication with the main module. Each panel module presents a panel interface within the user interface shell. Each panel module is individually configurable and each panel is configurable as part of the user interface presented by the main module. In addition the user interface has a mini-program window display means, a launch selection area display means and an activating means.

The mini-program window display means displays a plurality of mini-program windows within a first panel interface. Each mini-program window has a first background pattern. Each mini-program window represents a virtual computing screen. Mini-windows shown in the mini-program windows each represent an application window displayed in the represented virtual computing screen.

The launch selection area display means displays a plurality of application launch selection areas within a second panel interface. The activating means activates an application process associated with a first application launch selection area in a first virtual computing screen represented by a first mini-program window in response to a user indicating a selection of the first application launch selection area from the application launch selection areas and the selection of the first mini-program window from the plurality of mini-program windows.

In the preferred embodiment of the present invention, the activating means activates the application process in response to a user placing a cursor over the first application launch selection area, depressing a mouse button, moving the cursor over the first mini-program window and releasing the mouse button. Also, in the preferred embodiment a first virtual computing screen is displayed in response to a user selecting a first user defined hot key and a second virtual computing screen is displayed in response to the user selecting a second user defined hot key. The first user defined hot key and the second user defined hot key are changed in response to user selections.

Additionally in the preferred embodiment, a first arrangement of application windows displayed in virtual computing screens may be designated as a start-up layout in response to a user selection. The application windows in the virtual computing screens are opened in the first arrangement upon starting up the user interface shell.

In the preferred embodiment of the present application, when a first application is designated by a user as a sticky application, a first application window for the first application is displayed within every virtual computer computing screens being currently displayed. The first background pattern may also be changed to be substantially similar to a screen background pattern for each virtual computing screen in response to a first user selection. Likewise, the first background pattern may be changed to be substantially similar to a bit mapped pattern contained in a first file in response to a second user selection.

DESCRIPTION OF THE PREFERRED EMBODIMENT

Figure 1:
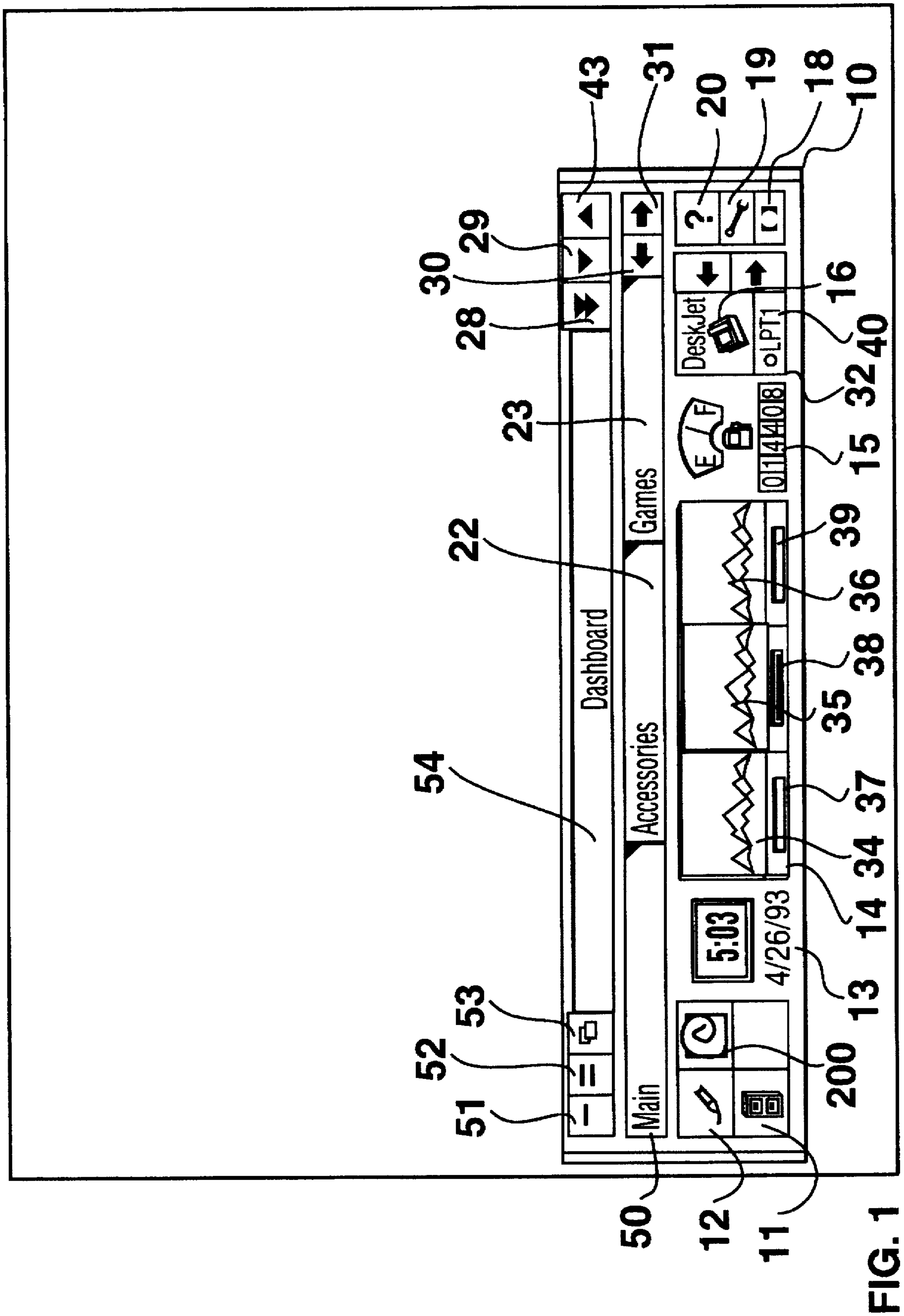
FIG. 1 shows a dashboard interface, in accordance with the preferred embodiment of the present invention.

FIG. 1 shows a graphic representation of an interface in accordance with the preferred embodiment of present invention. A computer "dashboard" interface 10 is placed on a computer screen, for example, in an unused region near the bottom of the screen. In the preferred embodiment, the default position of dashboard interface 10 can be anywhere on the computer screen. For information on computer dashboard interfaces, see co-pending U.S. patent application Ser. No. 08/079,720, filed Jun. 18, 1993, by Claudia Carpenter, George A. Hansen, Beatrice M. Y. Lam, Lawrence Lozares, Krisztina Mako, Paul A. Mernyk, and Robert Chris Robnett for USER INTERFACE WITH INDIVIDUALLY CONFIGURABLE PANEL INTERFACES FOR USE IN A COMPUTER SYSTEM, which is hereby incorporated by reference.

As shown in FIG. 1, dashboard interface 10 includes various panels. For example, FIG. 1 shows a quick launch panel which includes a quick launch button 11, a quick launch button 12, a quick launch button 200, an alarm clock panel 13, an extended screens display panel 14, a resource panel 15 and a printer manager panel 32. Additionally, there is shown an about button 18, a customize button 19, a help button 20, a maximize button 43, a minimize button 29, a show/hide program menu button 28, a title bar 54, a system menu button 51, a task menu button 52, a layout menu button 53 and a program menu panel 50. Printer manager panel 32 includes a first printer button 16 and a first default printer indicator button 40. Selection of the default printer indicator button under a printer icon results in that printer becoming the default printer. An area within the default printer indicator button for the selected default printer is highlighted indicating the default printer to the computer user.

Extended screens display panel 14 includes a mini-program window 34, a mini-program window 35, a mini-program window 36, a selection bar 37, a selection bar 38 and a selection bar 39. Program menu panel 50 includes a program group button 21, a program group button 22 and a program group button 23. A shift button 30 is used to shift group tabs in program menu 50 to the left. A shift button 31 is used to shift group tabs in program menu 50 to the right.

A program from program menu panel 50 may be launched by first selecting the program group button. All of the programs within that group will then be displayed. A listed program may then be selected to run. Also, the group window may be opened to display all programs as icons.

Figure 2:
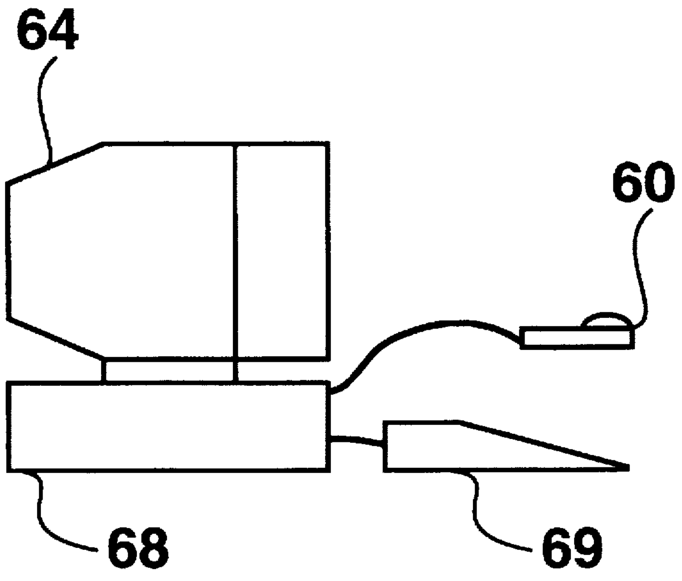
FIG. 2 shows a computing system which runs the dashboard interface shown in FIG. 1, in accordance with the preferred embodiment of the present invention.
Figure 3:
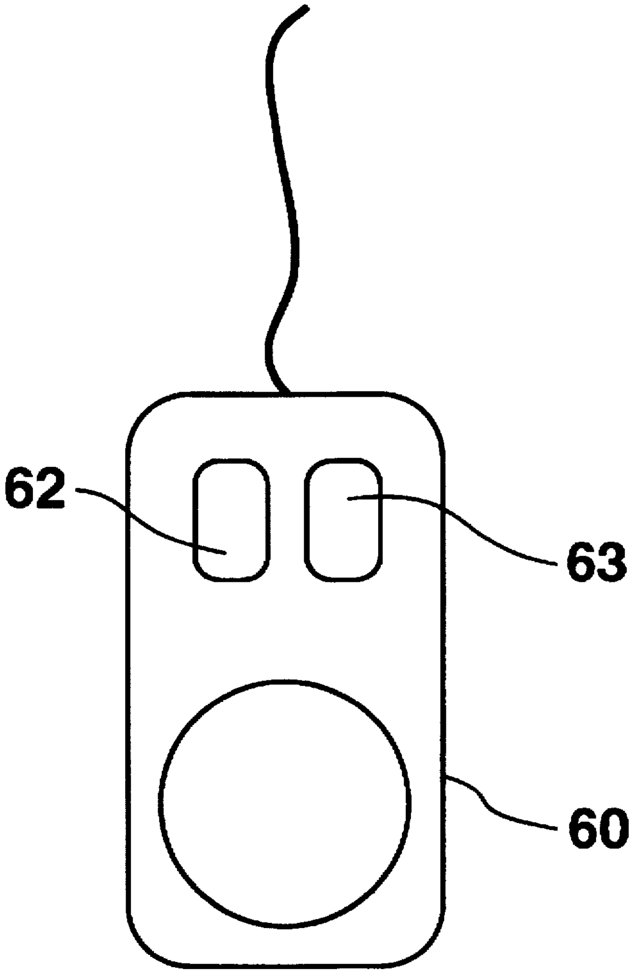
FIG. 3 shows a mouse utilized in the computing system shown in FIG. 2, in accordance with the preferred embodiment of the present invention.

FIG. 2 shows a block diagram of a computer system which generates and displays dashboard interface 10. A computer 68 controls a monitor 64. A keyboard 69 and a mouse 60 are utilized to interface with the computer system. FIG. 3 shows mouse 60 to include a button 62 and a button 63.

A highlight in selection bar 38 indicates that mini-program window 35 is the active (i.e. the displayed) virtual computing screen. Also, the mini-program window for the active virtual computing screen is highlighted.

Figure 4:
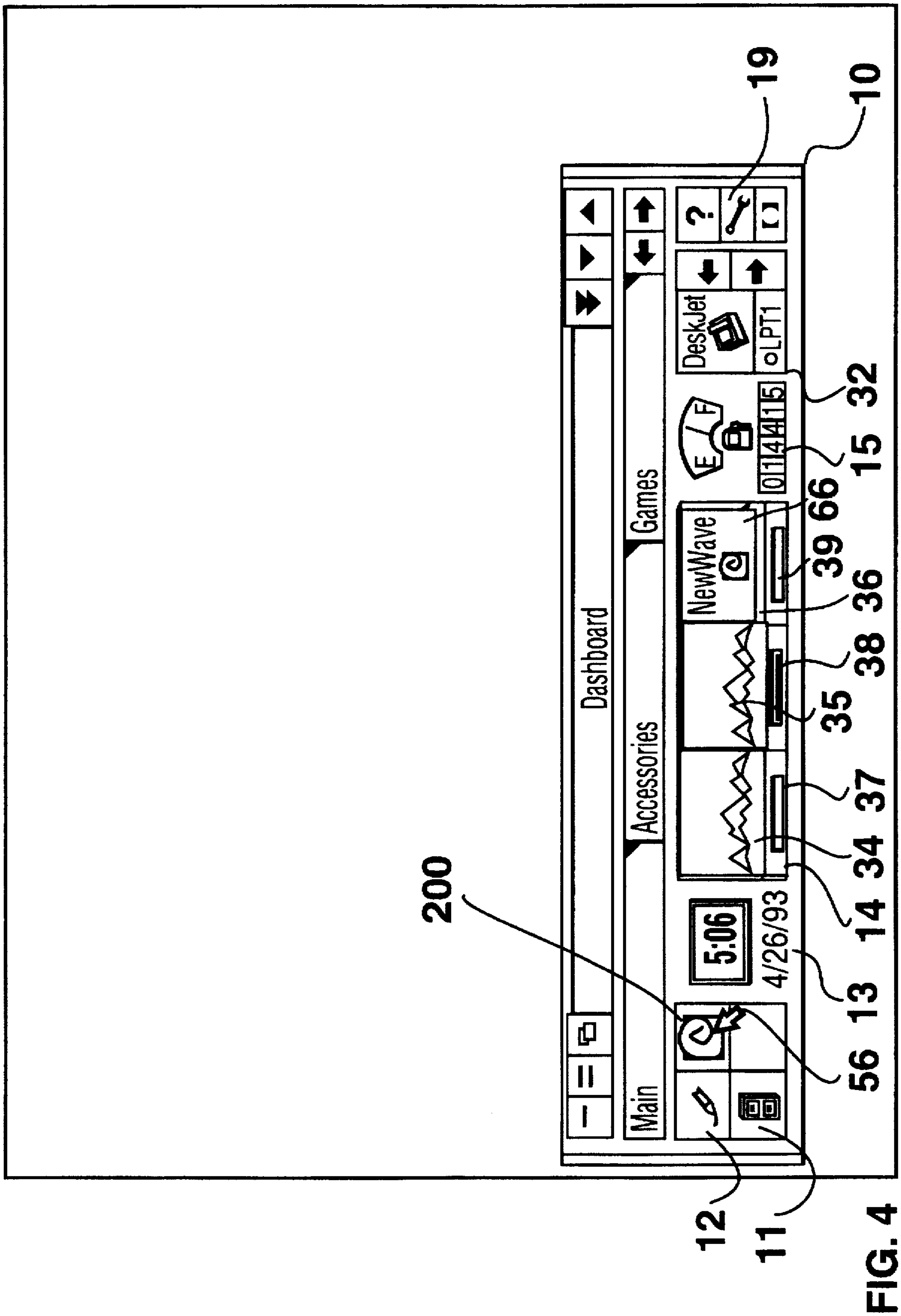
FIGS. 4 through 22 show computer screens which illustrate implementation of a dashboard interface in accordance with the preferred embodiment of the present invention.

Mouse 60 and a cursor 56 may be used to launch a program within any available virtual computing screen. For example, the NewWave application, represented by quick launch button 200, may be launched in the virtual computing screen represented by mini-program window 36 by placing cursor 56 over quick launch button 200, depressing button 62, moving cursor 56 to be over mini-program window 36 and releasing button 62. The result is seen in FIG. 4. In FIG. 4, a mini-window 66 for the NewWave application appears within mini-program window 36.

Figure 5:
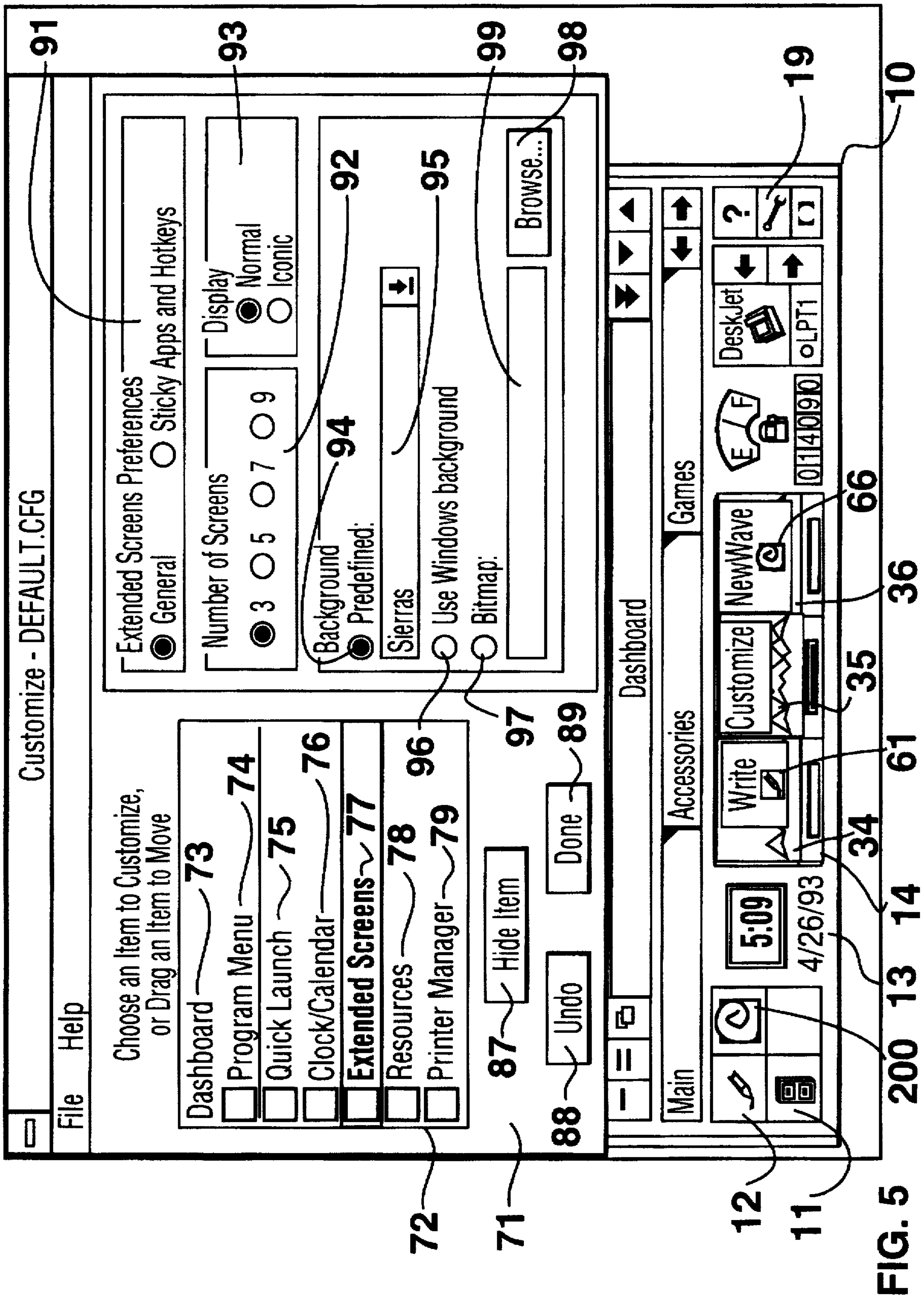

Mouse 60 and cursor 56 may also be used to launch the Write application, represented by quick launch button 12. For example the Write application is launched in the virtual computing screen represented by mini-program window 34 by placing cursor 56 over quick launch button 11, depressing button 62, moving cursor 56 to be over mini-program window 34 and releasing button 62. The result is seen in FIG. 5. In FIG. 5, a mini-window 61 for the Write application appears within mini-program window 34.

Using cursor 56 and mouse 60 to select customize button 19 results in a customize window 71 appearing, as shown in FIG. 5. Within customize window 71, customize menu 72 lists items within dashboard interface 10. These include a listing 73 for dashboard interface 10, a listing 74 for the program menu, a listing 75 for Quick launch, a listing 76 for alarm clock 13, a listing 77 for extended screens display 14, a listing 78 for resource gauge 15 and a listing 79 for printer manager 32. Also shown are a hide/show button 87, an undo button 88 and a done button 89.

In FIG. 5, extended screens listing 77 is highlighted. Therefore, an extended screens preferences sub-window is shown. The extended screens sub-window includes an extended screens preferences selection box 91, a number of virtual computing screens selection box 92, a display preference selection box 93 and a background selection area 90. Background selection area 90 includes a predefined background selection 94, a predefined background selection box 95, a "Use Windows background" selection 96, a bitmap background selection 97, a bitmap background selection box 99 and a browse button 98.

Background selection area 90 is used to select a background for mini-program windows 34, 35 and 36 within extended screens display panel 14. In FIG. 5, a "Sierras" background is selected, as seen in predefined background selection box 95. In a FIG. 6, "Use Windows background" selection 96 is used to select the same background for mini-program windows 34, 35 and 36 as is used for the background of Windows. Also, bitmap background selection 97 and bitmap background selection box 99 may be used to select a background from a bitmap file.

Figure 6:
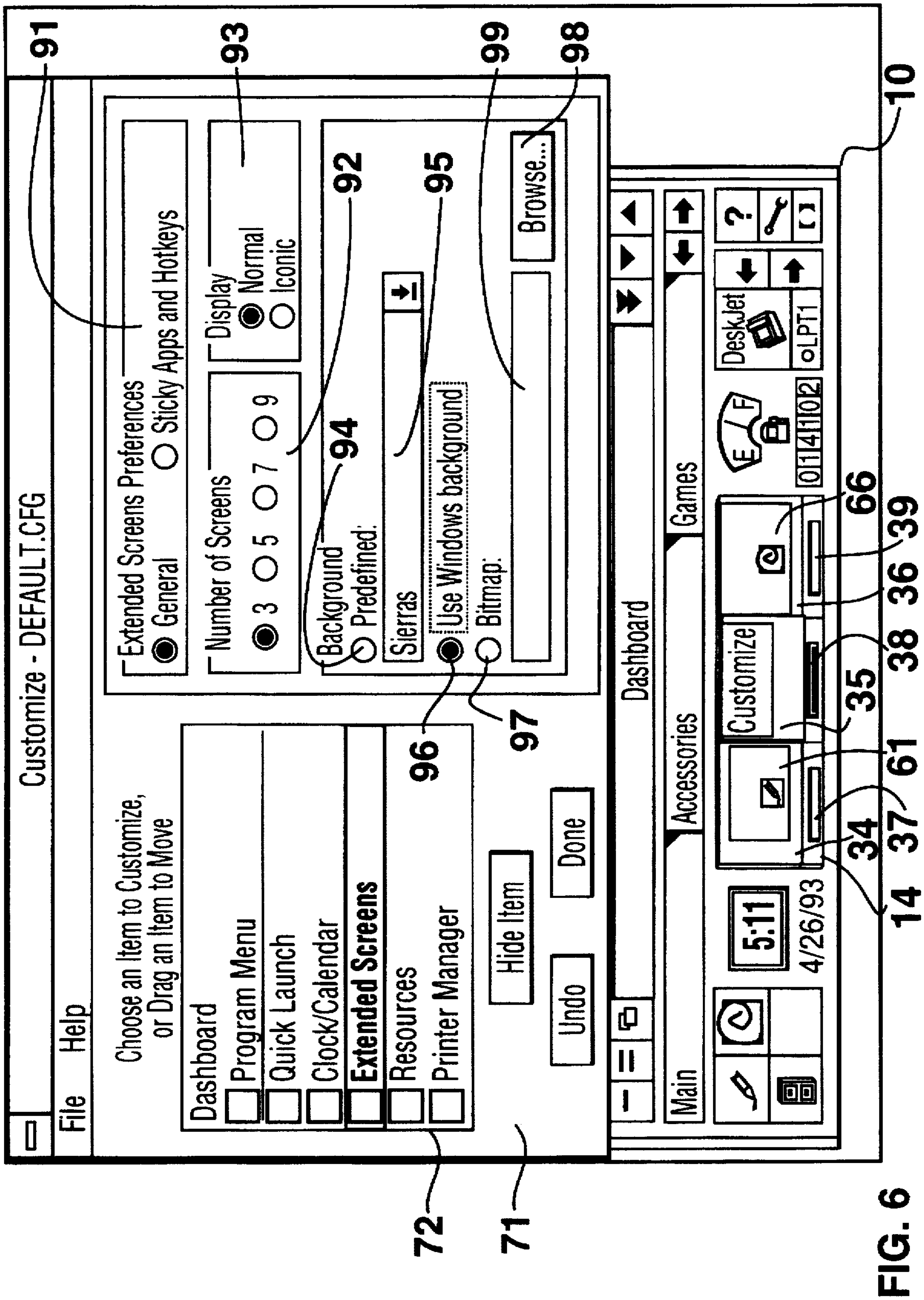
Figure 7:
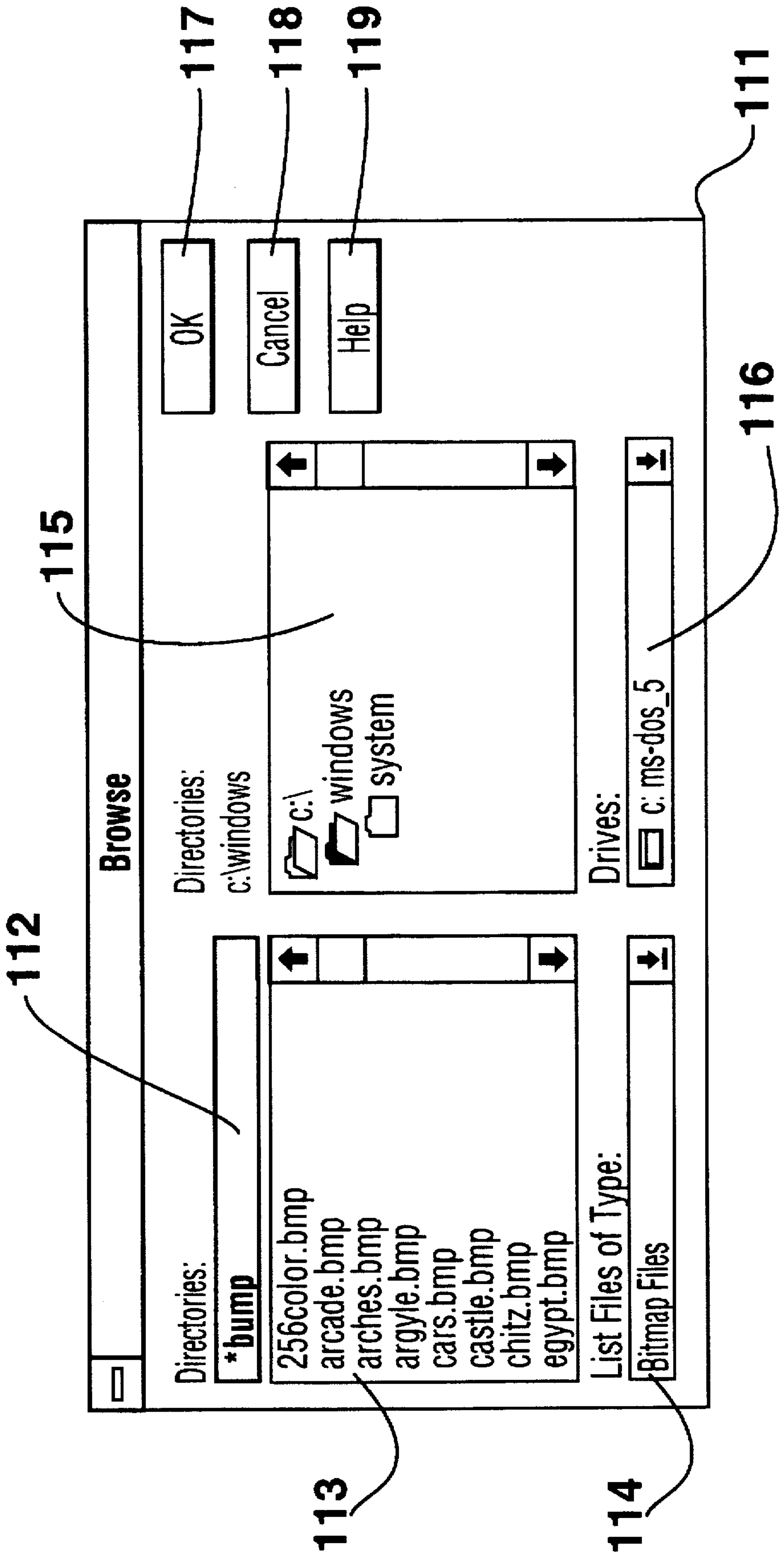

In FIG. 6, no bitmap file is shown within bitmap background selection box 99. By selecting browse button 98, a browse window 111 appears, as shown in FIG. 7. Browse window 111 includes a file name selection box 112, a file listing box 113, a file type box 114, a directory box 115, a drives box 116, an OK button 117, a Cancel button 118 and a Help button 119. Browse window 111 may be used to select a source file for a bitmap background.

Figure 8:
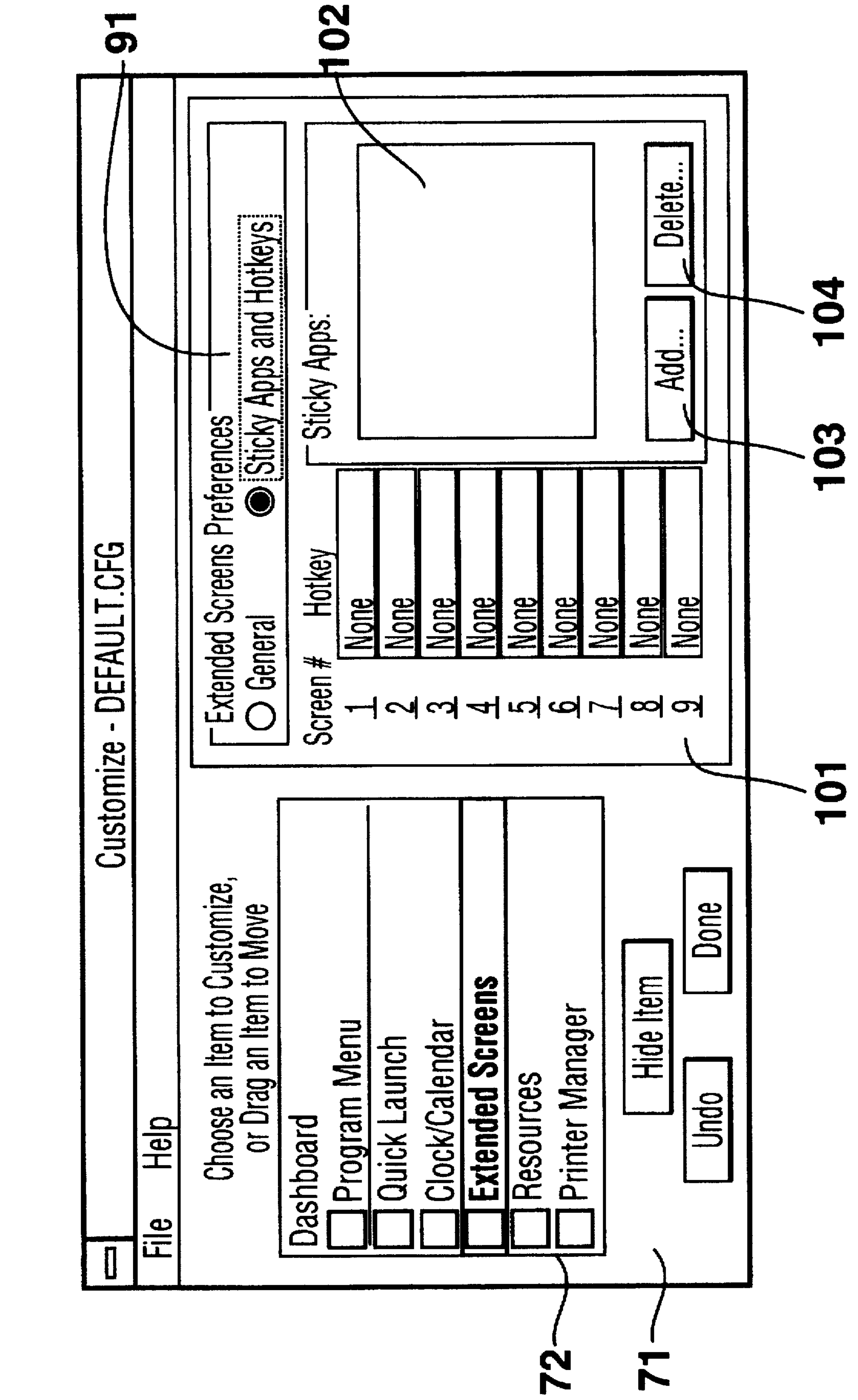
Figure 9:
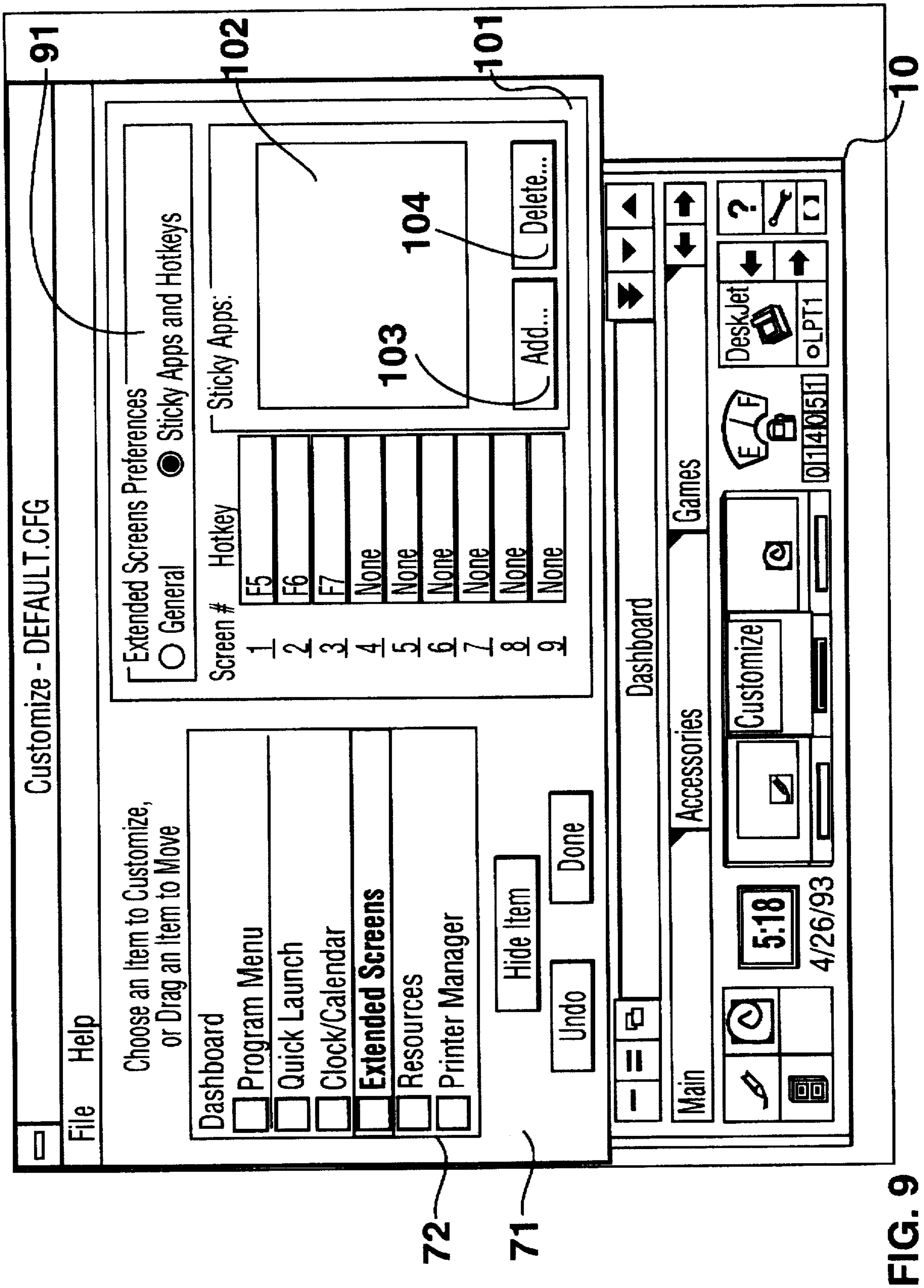

When "Sticky Apps and Hotkeys" is selected in extended screens preferences selection box 91, customize window 71 includes hotkey selection boxes 101, sticky application listing box 102, add button 103 and delete button 104, as shown by FIG. 8. For each extended screen, hotkeys may be added in hotkey selection boxes 101. For example, as shown in FIG. 9, the hotkey "F5" is added to the hotkey selection box associated with virtual computing screen #1 (mini-program window 34), the hotkey "F6" is added to the hotkey selection box associated with virtual computing screen #2 (mini-program window 35), and the hotkey "F7" is added to the hotkey selection box associated with virtual computing screen #3 (mini-program window 36).

Figure 10:
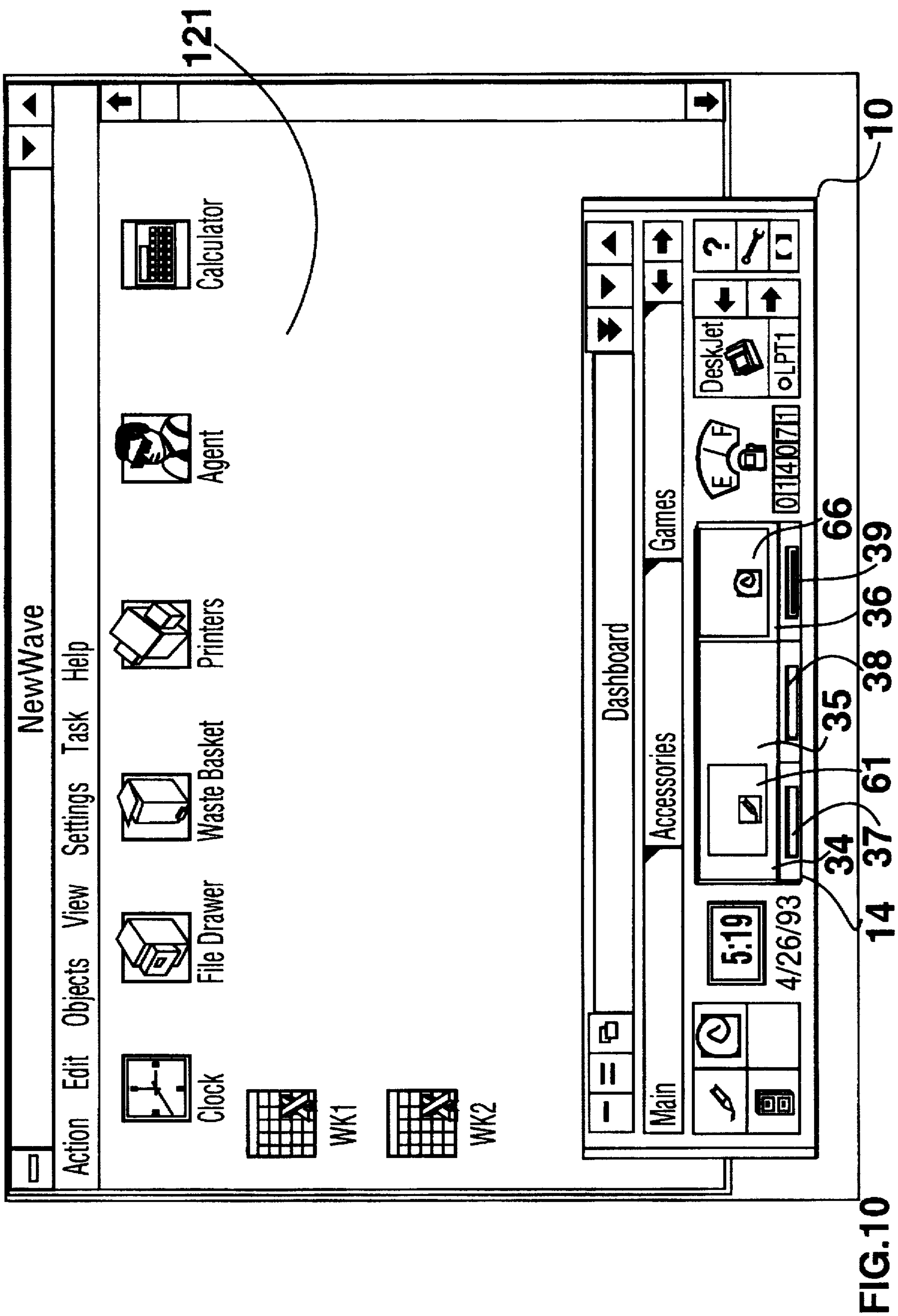

Once hotkeys have been added, they may be used to scroll between virtual computing screens. For example, depressing the key "F7" on keyboard 69 results in the virtual computing screen represented by mini-program window 36 being displayed, as shown in FIG. 10. The virtual computing screen represented by mini-program window 36 includes a window 121 for the NewWave application. A highlight in selection bar 39 indicates that mini-program window 36 is now the active (i.e. the displayed) virtual computing screen. Also, mini-program window 36 for the active virtual computing screen is highlighted.

Figure 11:
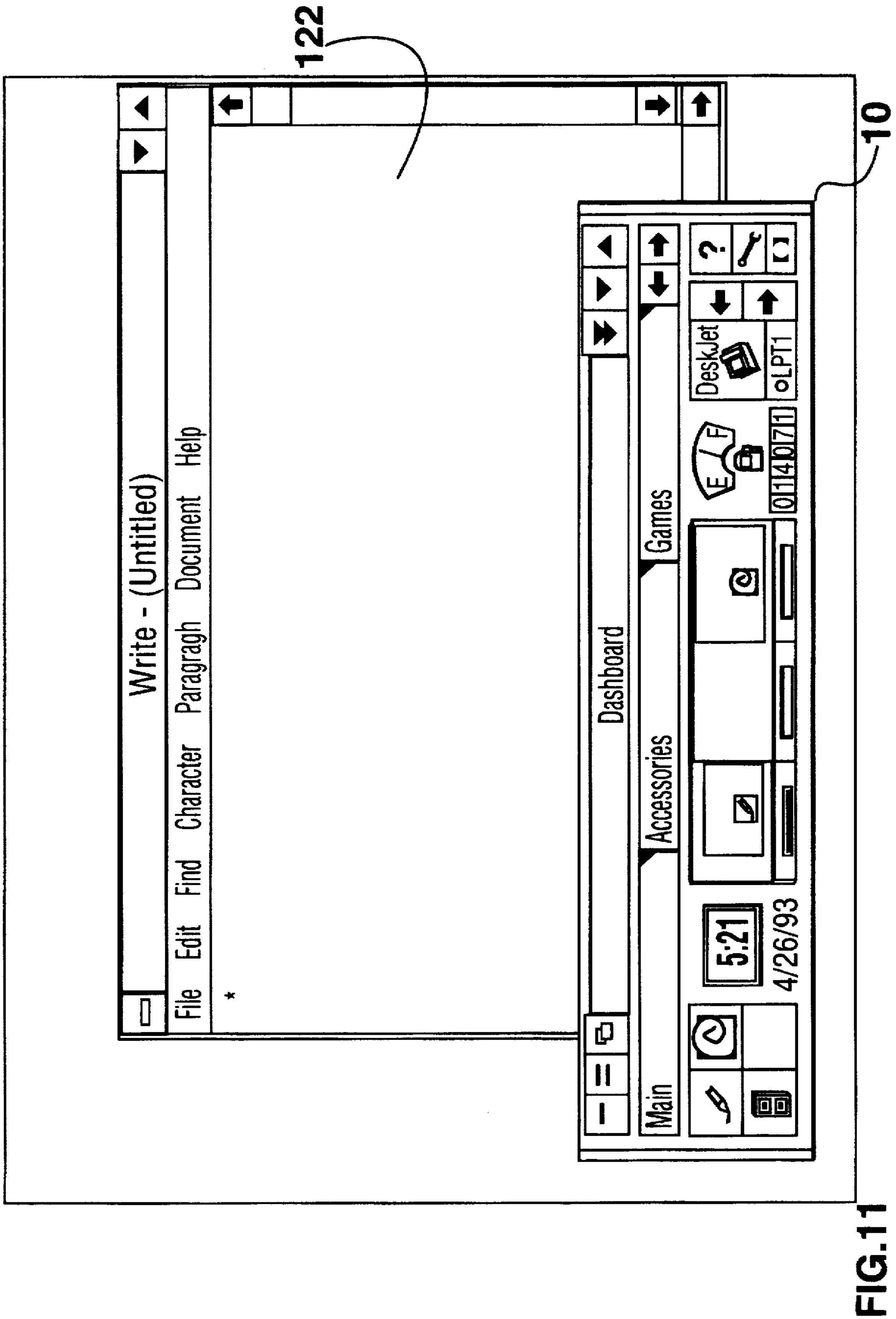

Depressing the key "F5" on keyboard 69 results in the virtual computing screen represented by mini-program window 34 being displayed, as shown in FIG. 11. The virtual computing screen represented by mini-program window 34 includes a window 122 for the Write application. A highlight in selection bar 37 indicates that mini-program window 34 is now the active (i.e. the displayed) virtual computing screen. Also, mini-program window 34 for the active virtual computing screen is highlighted.

Figure 12:
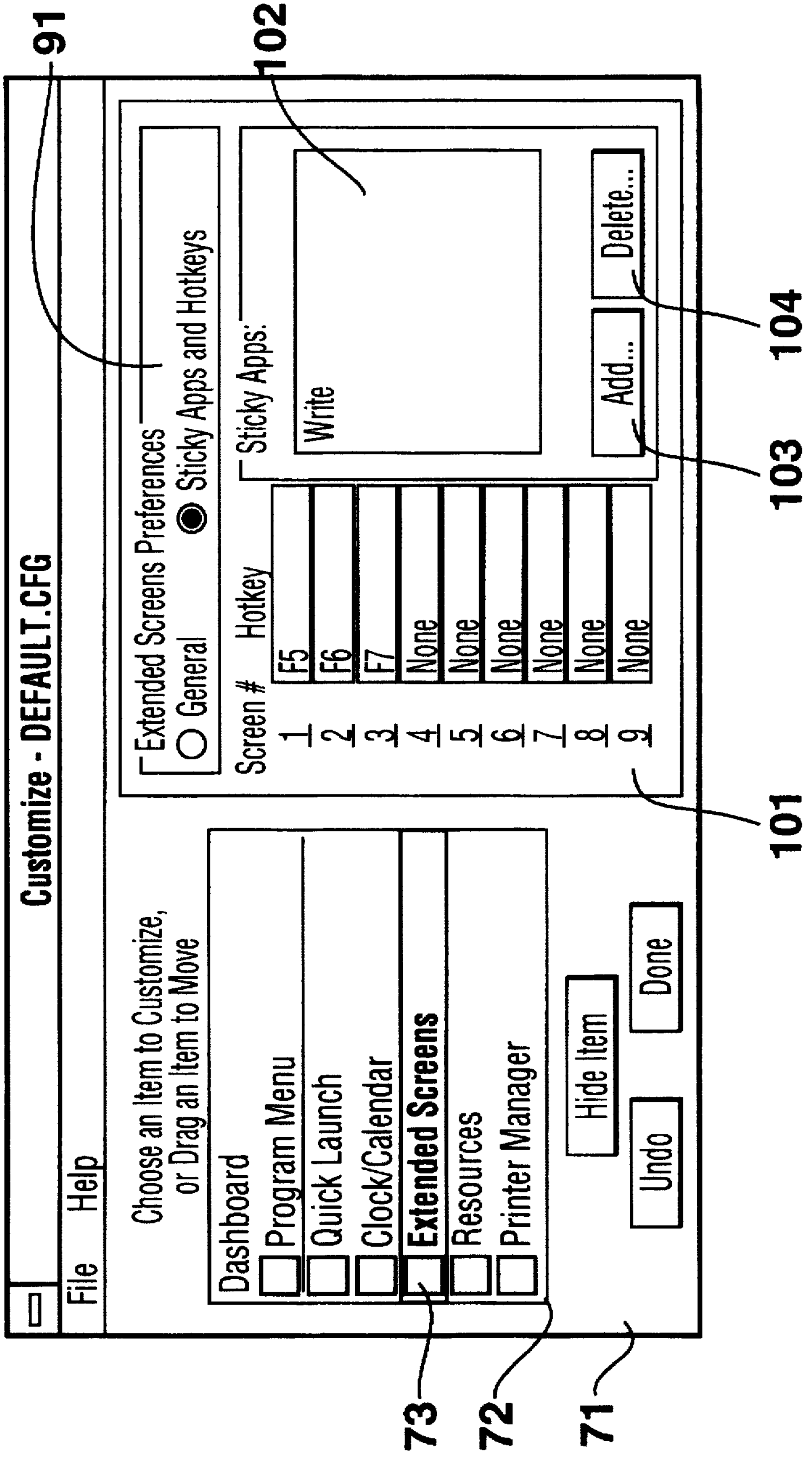
Figure 13:
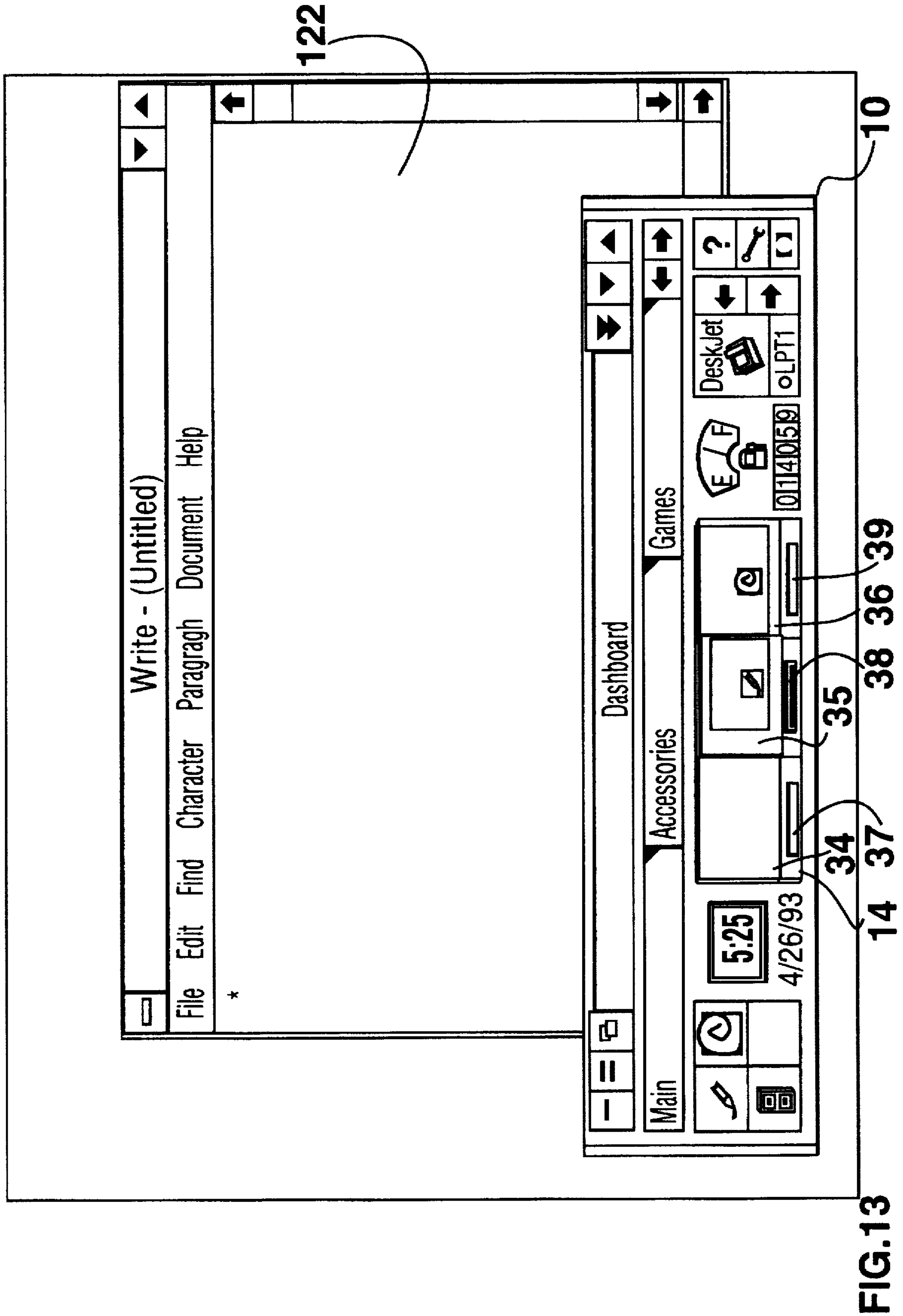
Figure 14:
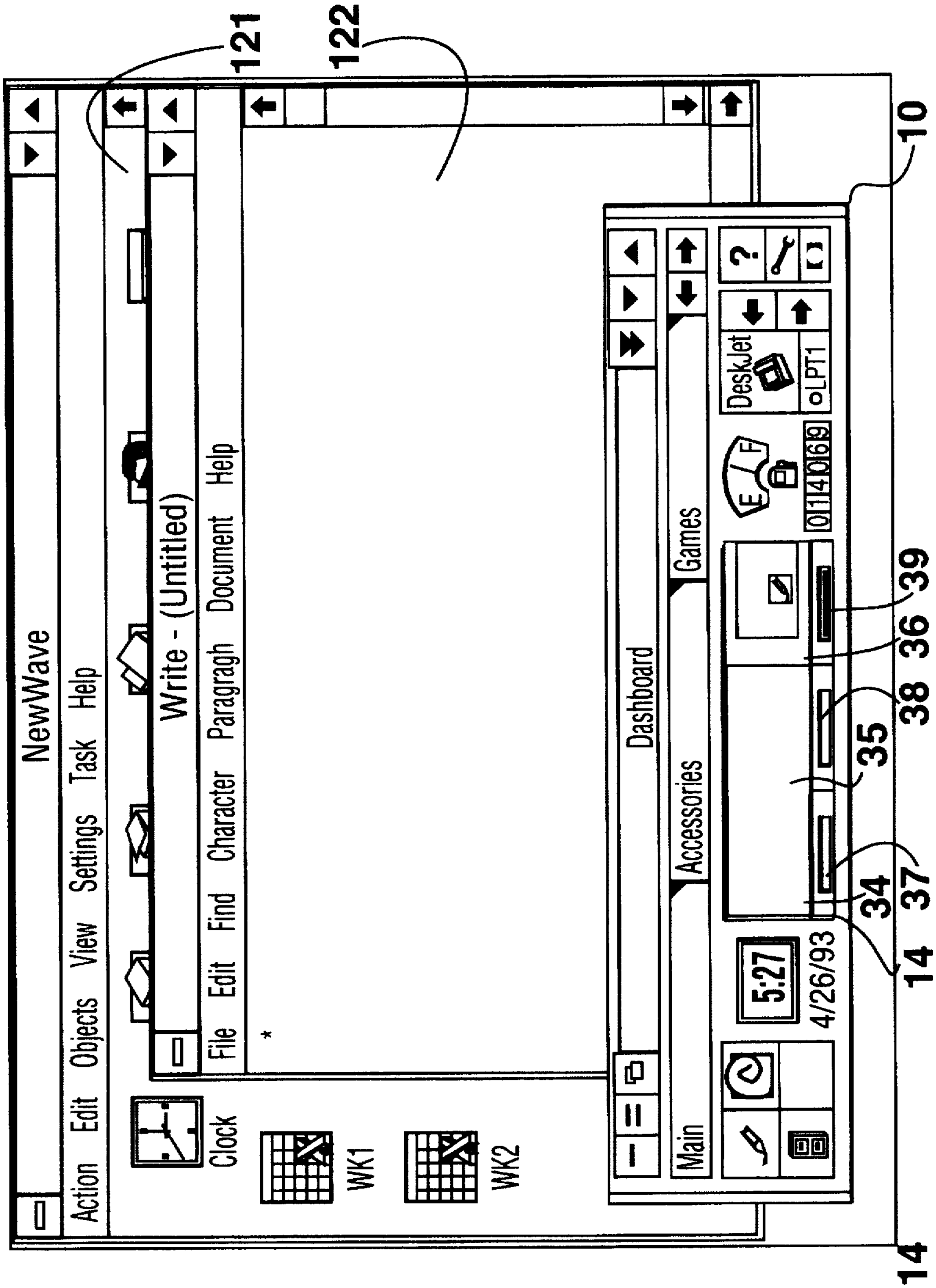

In FIG. 12, the application "Write" has been designated a sticky application in sticky application listing box 102. A sticky application is an application which is displayed in the active display virtual computing screen, even as the particular active display virtual computing screen changes. For example, window 122 for the application Write is originally in the virtual computing screen represented by mini-program window 34. When a user selects the virtual computing screen represented by mini-program window 35 as the active virtual computing screen, for example, by placing cursor 56 over selection bar 38 and clicking mouse button 62, window 122 for the write application is displayed in the virtual computing screen represented by mini-program window 35, as shown in FIG. 13. When the user selects the virtual computing screen represented by mini-program window 36 as the active virtual computing screen, for example, by placing cursor 56 over selection bar 39 and clicking mouse button 62, window 122 for the write application is displayed in the virtual computing screen represented by mini-program window 36, as shown in FIG. 14.

Figure 15:
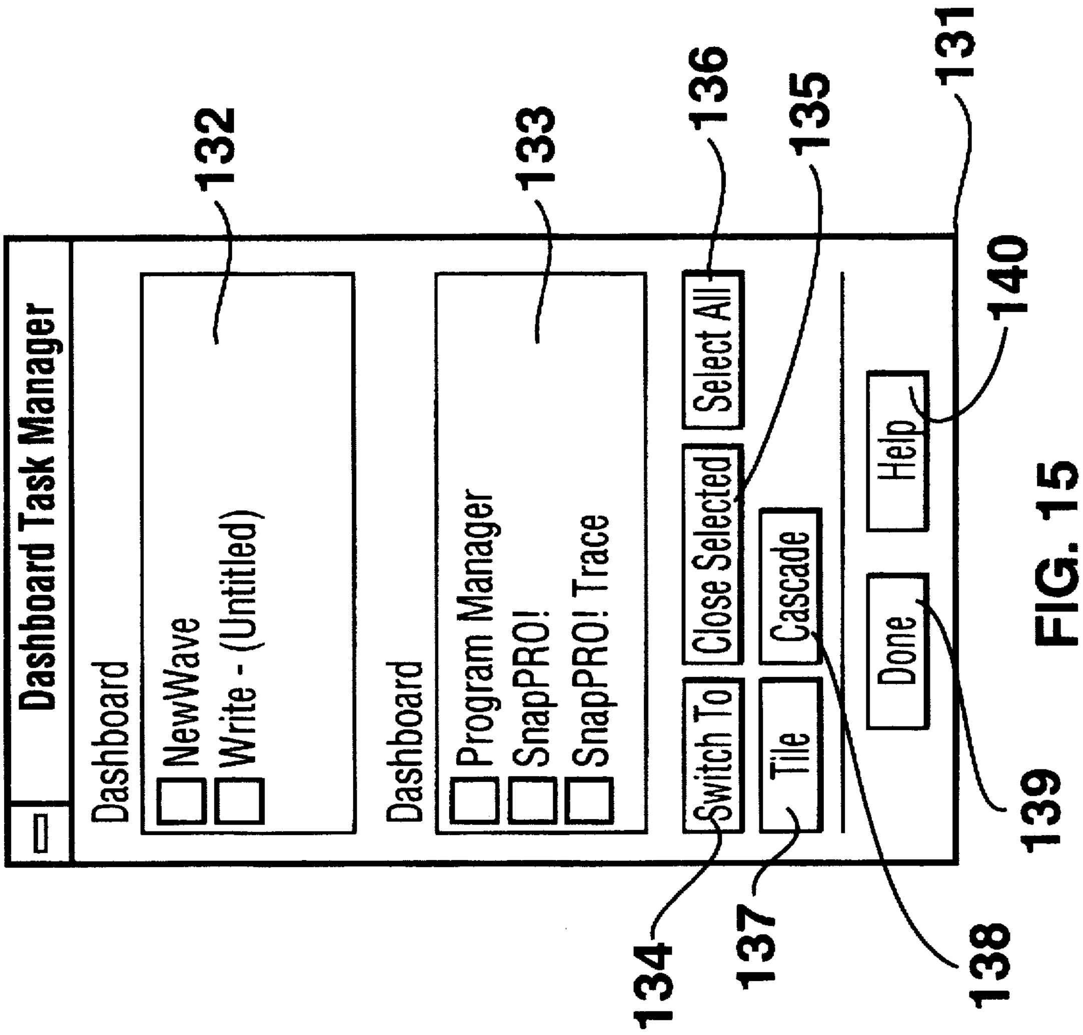

A dashboard task manager window 131, shown in FIG. 15, may be accessed, for example, by placing cursor 56 over the windows background and clicking button 62 on mouse 60 twice in quick succession, or typing CTRL+ESC on keyboard 69. Dashboard task manager window 131 includes a task list 132, a minimized application list 133, a switch to button 134, a Close selected button 135, a select all button 136, a tile button 137, a cascade button 138, a done button 139 and a help button 140.

Figure 16:
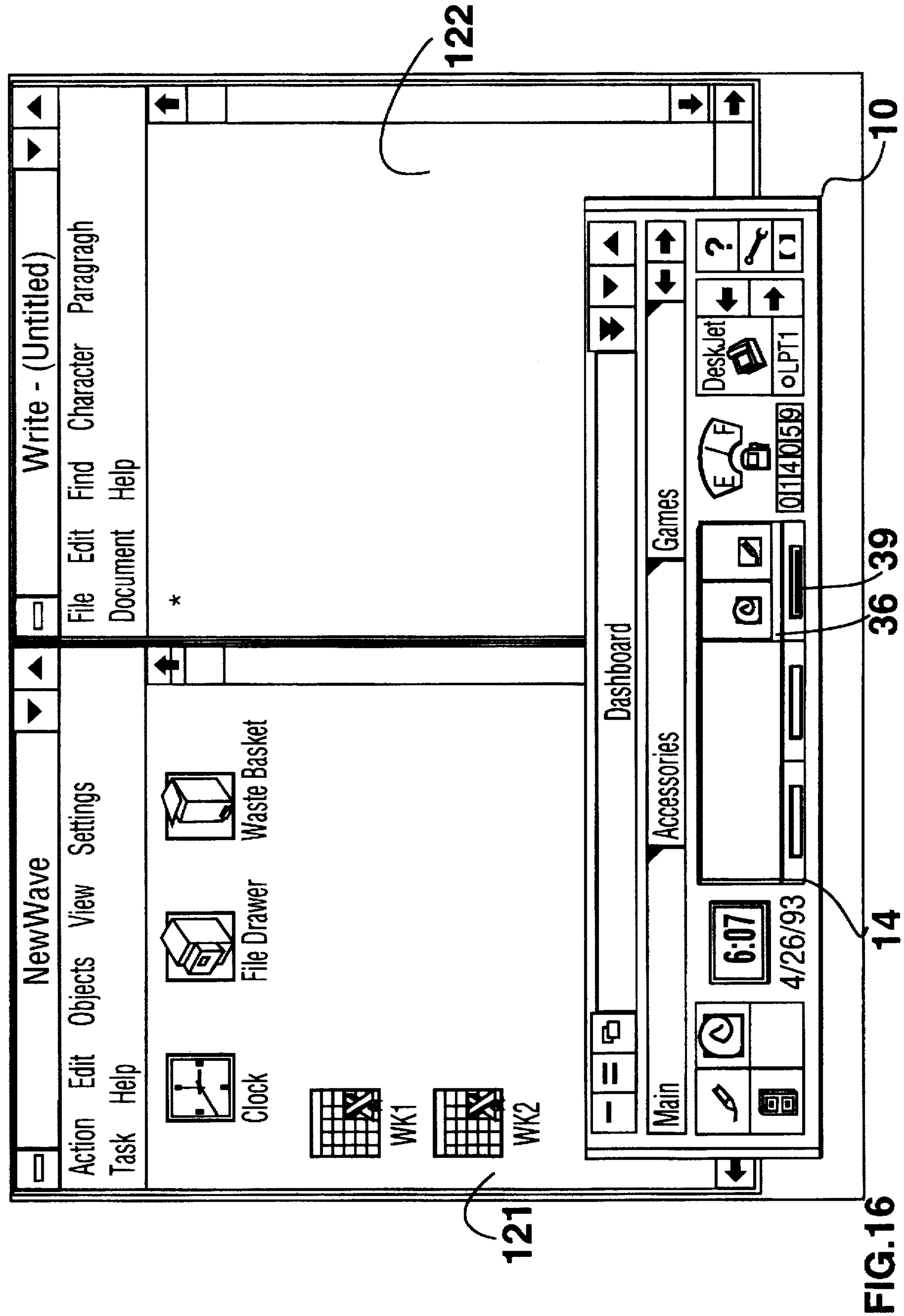

Selecting tile button 137 results in tiling of windows. For example, FIG. 16 shows window 121 for the NewWave application tiled with window 122 for the Write application.

Figure 17:
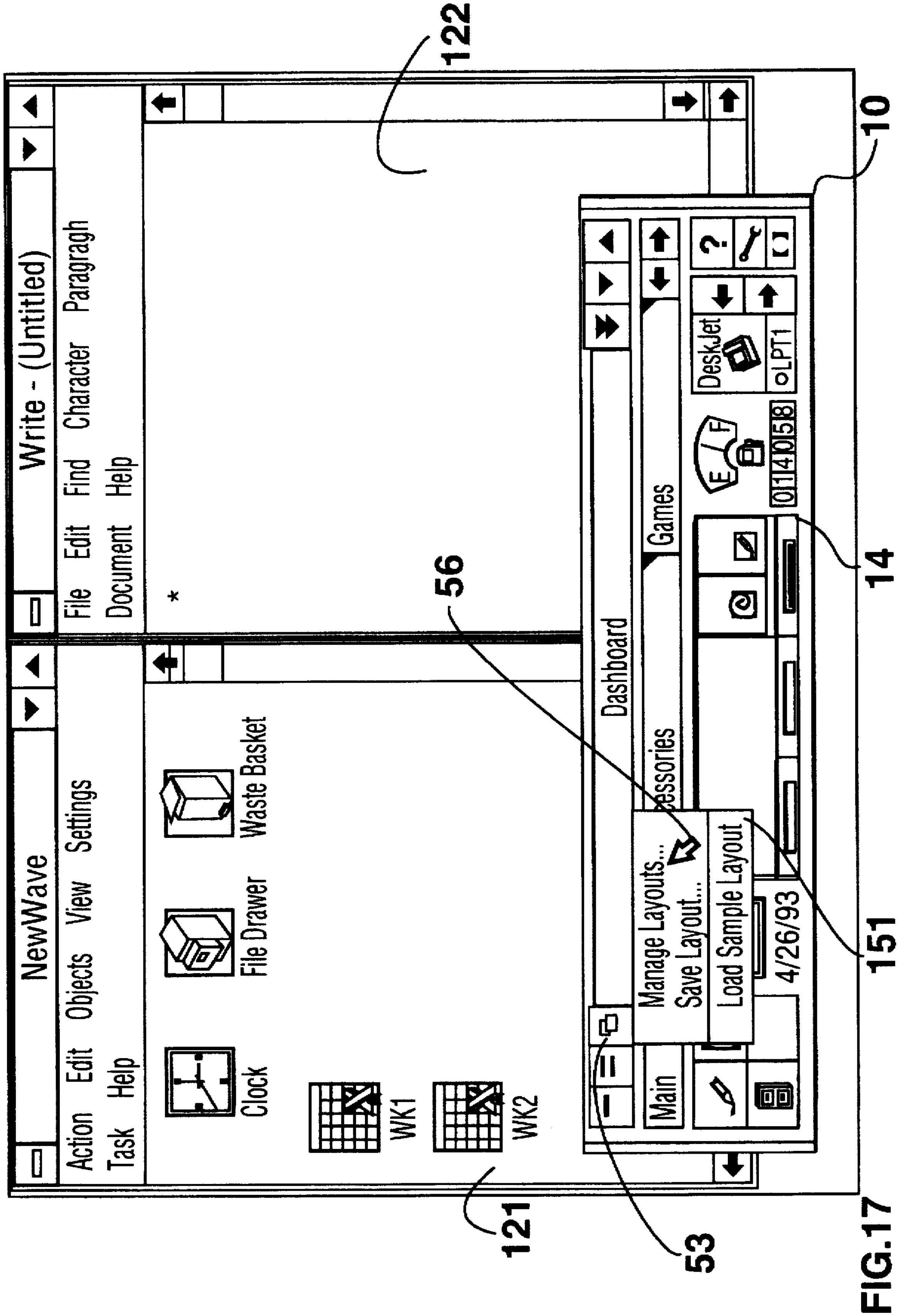
Figure 18:
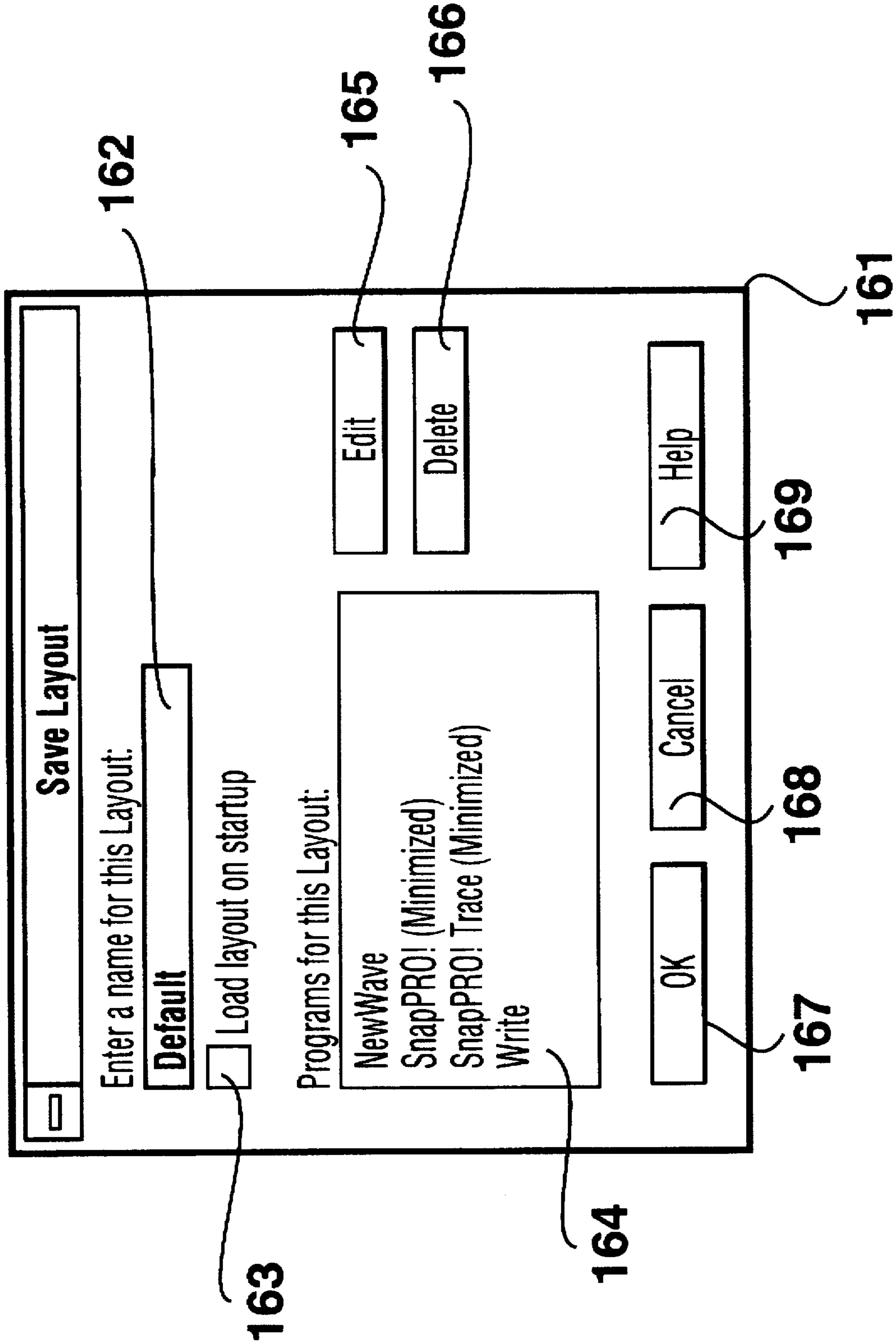

Placing cursor on layout menu button 53 and depressing button 62 on mouse 60 results in a pull-down menu 151 being shown, as shown in FIG. 17. Selecting the selection "Save Layout . . . " from pull-down menu 151 results in the appearance of a Save Layout window 161 as shown in FIG. 18.

Save Layout window 161 includes a layout name box 162, a load layout box 163, a program listing 164, an edit button 165, a delete button 166, an OK button 167, a Cancel button 168 and a Help button 169.

Figure 19:
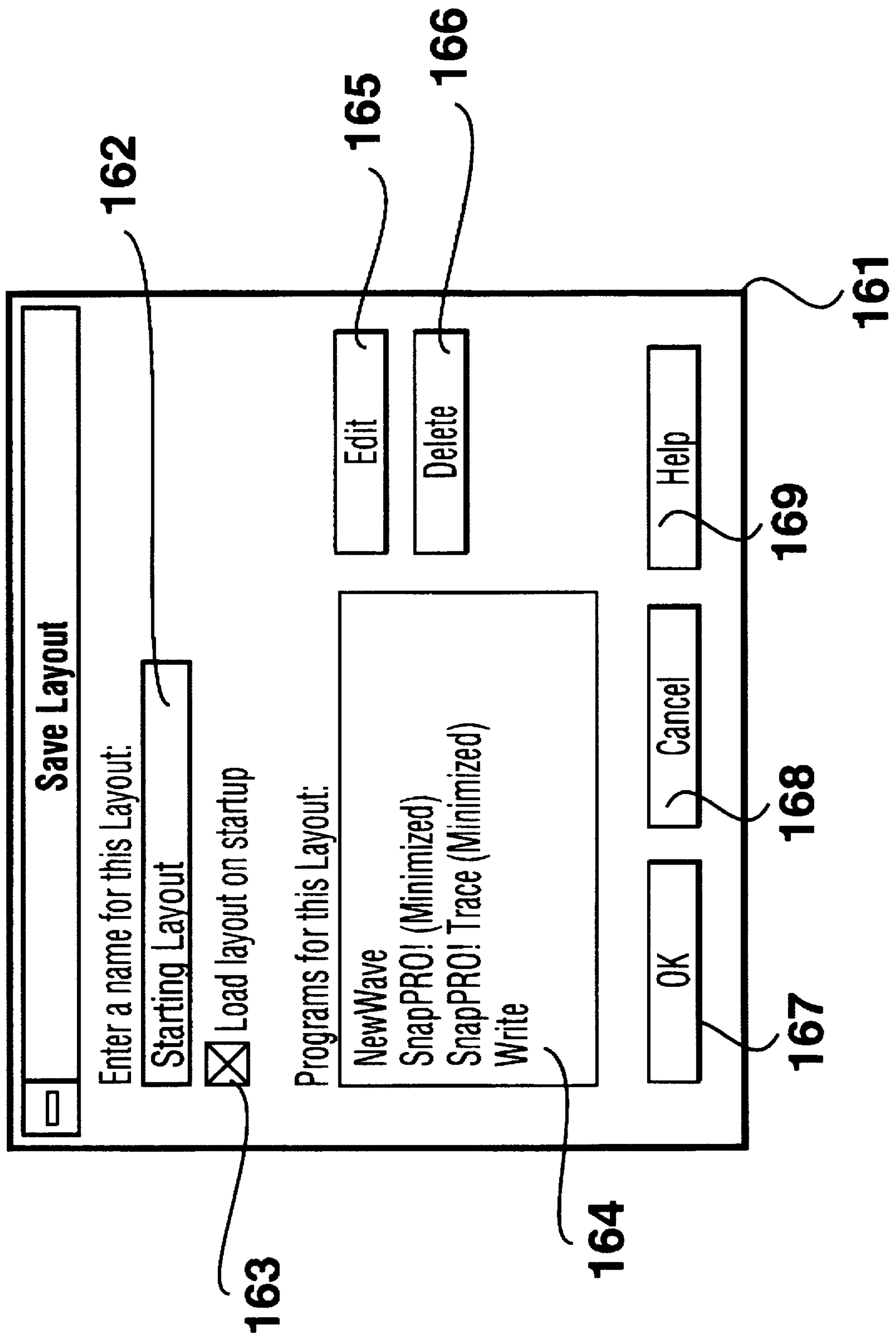

As shown in FIG. 19, the current layout has been named "Starting layout" as seen in layout name box 162. In FIG. 19, load layout box 163 is selected indicating that the current layout ("Starting layout") will be loaded upon the start-up of dashboard 10.

Figure 20:
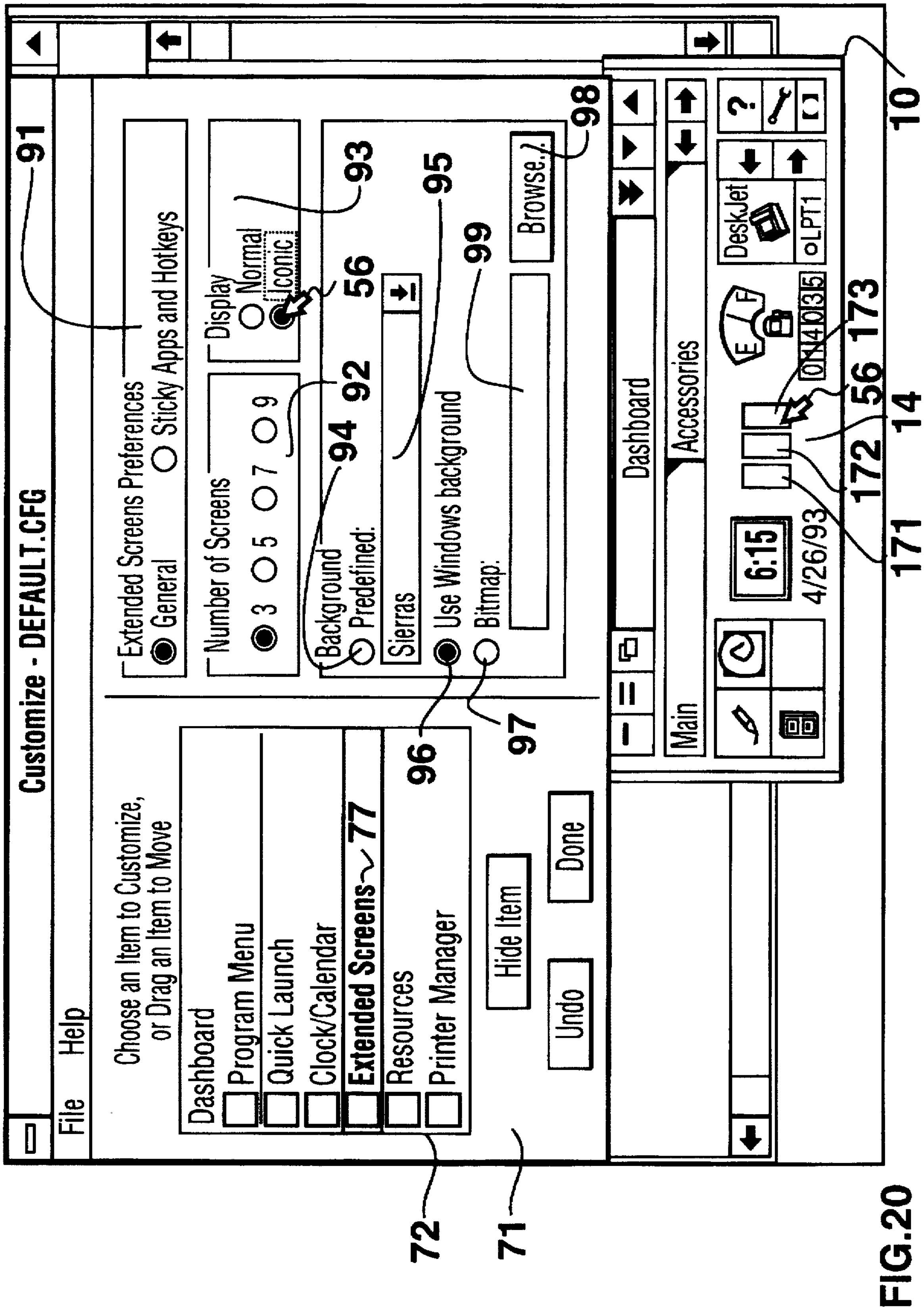

Selection of "iconic" in the display preference selection box 93 results in the display of extended screens display panel 14 being altered to appear in icon form, as shown in FIG. 20. Extended screens display panel 14 includes a button 171, a button 172 and a button 173, each representing a virtual computing screen. Selection of a button results in the associated virtual computing screen being displayed.

Figure 21:
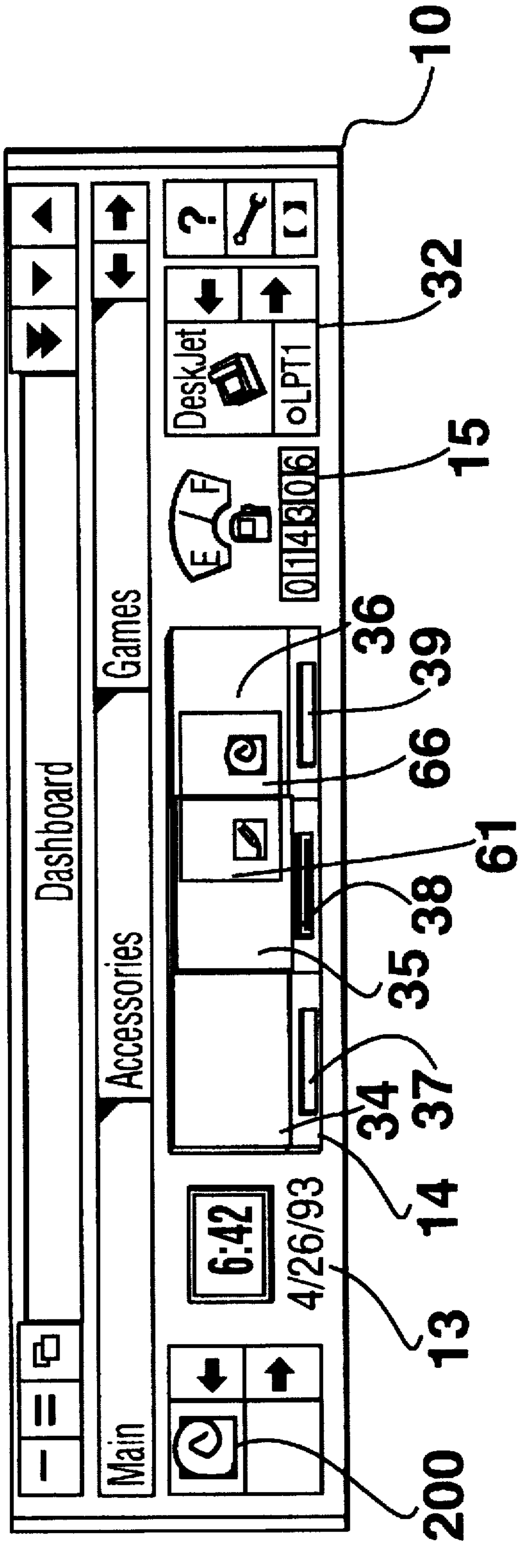
Figure 22:
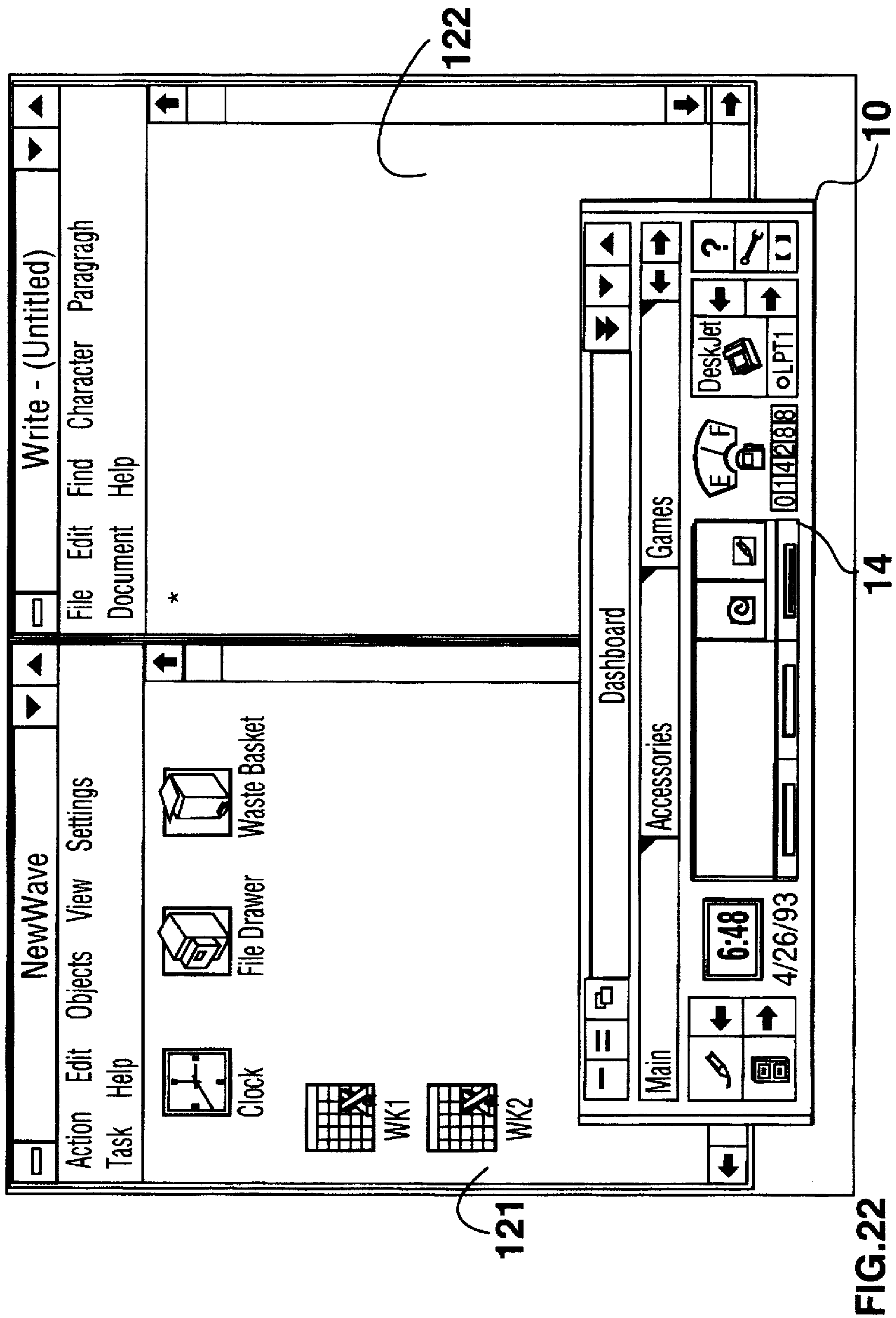

Even though the layout of dashboard 10 has changed, when dashboard 10 is started anew, "Starting layout" will be loaded as shown in FIG. 21. When dashboard 10 is started, the active window is the window represented by mini-program window 34. Therefore, mini-window 61 for the Write application appears within mini-program window 34, because in the "Starting layout" the Write application is a sticky application. When the user selects the virtual computing screen represented by mini-program window 36 as the active virtual computing screen, for example, by placing cursor 56 over selection bar 39 and clicking mouse button 62, window 122 for the write application is displayed in the virtual computing screen represented by mini-program window 36, as shown in FIG. 22. FIG. 22 shows window 121 for the NewWave application tiled with window 122 for the Write application. Window 121 for the NewWave application is tiled with window 122 for the Write application because in the "Starting layout" tile button 137 is selected.

Appendix A includes the source listing of a software module, SCREENS.C which gives an example of a software implementation of the features of the present invention.

For example, for a drag of a launch button to an extended screen to launch an application, the source of the drag can be a number of locations. If the source is from a Dashboard panel, SCREENS.C will get the message WM_DBDROPFILES (line 875). If the source is from the windows file manager, the standard drag- drop protocol defined by Windows is used, in which case SCREENS.C gets the message WM_DROPFILES (line 865). Both cases are handled similarly—the first calls ProcessDBDropFile (line 1232) and the second calls ProcessDropFile (line 1162).

ProcessDBDropFile has a "for" loop (line 1264) which cycles through each file dropped onto screens. For each file, SCREENS.C runs the program by calling RKExec. After the program is run, MoveWindowToSpace (line 1315) is called to move the application To the virtual screen that it was dropped on.

When a hotkey is used to display a virtual computing screen, when a hot key is pressed, the routine TestHotKey (line 1348) is called. SCREENS.C has an global array of hotkeys (gConfig.hotkeys), each corresponding to a virtual screen. This array is checked to see if the hotkey entered ("wCode") corresponds to one of the screens hotkeys (for loop at line 13). If it does, a WM_COMMAND is sent to the main screens window procedure with the command ID_CHANGESPACE. The array element which matched the entered hotkey corresponds to the virtual screen to switch to. This is passed in the message also (PostMessage at line 1364).

The ID_CHANGESPACE is processed at line 110. Most of the work is done in the routine MoveAllWindows (line 1371). In this routine, the "newScreen" is passed in as a parameter. First, all application windows that should appear in the current screen are moved so that they are now visible. Then all remaining windows are moved the same distance. This causes windows that were on the previous active screen to be moved away so that they are no longer visible.

When the user changes the user defined hot key in the Screens Preferences dialog box, the window procedure to the screens configuration (ConfigDlgProc) receives the message WM_HOTKEYCHANGE. An entry in the global array gConfig.hotkeys is set to the new hotkey (line 1539). This is now the new hotkey for the given screen.

The data for a layout is written in the routine WriteLayout (line 1785). The data for each layout is stored in a global array gLayoutList. The field "startup" within this array is set to TRUE if the layout is a startup layout. The value is determined by calling the windows routine "IsDlgButtonChecked". This returns TRUE if the user has checked the dialog box checkbox for startup layouts (line 1844).

When the shell is started, the screens panel posts a message WM_STARTUPLAYOUT to itself (line 463). This message is processed at line 468. It checks each layout in gLayoutList to see if the startup field is set. If it is, the layout is a startup layout and the routine LoadLayout is called to load the layout. The routine LoadLayout (line 1853) loads each of the applications in the specified layout. For each application, it also moves the application to the virtual screen stored in gLayoutList.

When the user designates an application as a sticky application, the routine AddStickyApp (line 2088) is called. The global memory array ghStickyApps is used to hold the classname of each sticky application (a "classname" is a unique string for every windows application). The routine AddStickyApp expands the array ghStickyApps, and adds the classname for the designated sticky application to the array.

The routine ResetSticky (line 2140) is then called. This goes through the internal task list maintained by SCREENS.C and sets a field "bSticky" to TRUE for any tasks that have a classname that is in ghStickyApps.

Every time the current virtual screen is changed, the routine MoveAllWindows is called. This routine calls IsAMoveableWindow (line 2160) to determine if a window should be moved. If an application has the bSticky field as TRUE, it will not be moved. Thus, whenever the user switches screens, the sticky application will not be moved and will always appear on the current screen.

When the user selects the "Use Windows Background" radio button, the screens configuration window procedure receives a WM_COMMAND with ID BACKGROUNDWIN_RB (line 1584). The global variable gConfig.background is set to BACKGROUND_TYPE_WIN to indicate that the background should be taken from the current windows background. The routine LoadBackgrounds is called to get a copy of the current windows background. InvalidateSpaceRect is called to mark the screens background as invalid. This results in a repaint with the new background.

When the user selects the "Bitmap" radio button, the screens configuration window procedure receives a WM_COMMAND with ID_BACKGROUNDFILE_RB (line 1596). The global variable gConfig.background is set to BACKGROUND_TYPE_FILE to indicate that the background should be taken from a bitmap file. The actual file is not opened yet because the user may not have typed in the file name.

The routine CheckConfig (line 2229) is called when the screens dialog box is ready to be closed. At this time, the file name for the screens background should have already been typed in. The file name is retrieved by a call to the windows routine GetDlgItemText (line 2237). If the file exists, the routine LoadBackgrounds is called to get a copy of the image contained in the file. Finally, InvalidateSpaceRect is called to mark the screens background as invalid. This results in a repaint with the new background.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

Appendix A

```
/*****************************************************************************
  PanelWndProc
 *****************************************************************************/
long FAR PASCAL PanelWndProc(
HWND hWnd,
WORD msg,
WORD wParam,
LONG lParam)
{
int           i, j;
HDC           hDC;
RECT          rect;
PAINTSTRUCT   ps;
LPTASKARRAY   lpTaskArray;
TASKARRAY     taskInfo;
int           oldActive, newActive;
BOOL          bTemp;
POINT         point;
 SKARRAY*     ndwInfo;
 ht*          ndwIndex;
WORD          index;

  switch (msg)
    {
    case WM_MINLBUTTONUP:
      if ((GetAsyncKeyState(VK_MENU) & 0x8000) != 0)
        return FALSE;

      GetCursorPos(&point);
      GetWindowRect(ghWndDashboard, &rect);
      point.x -= rect.left;
      point.y -= rect.top;
      if (point.y < MINCAPTION_HEIGHT)
        return FALSE;
      else
        {
        for (i = 0; i < gConfig.numScreens; ++i)
          {
          GetMinSpaceRect(&rect, i);
          if (PtInRect(&rect, point))
            {
            SendMessage(hWnd, WM_COMMAND, ID_CHANGESPACE, MAKELONG(i,0));
            break;
            }
          }
        return TRUE;
        }
      break;

    case WM_LBUTTONUP:
      {
      for (i = 0; i < gConfig.numScreens; ++i)
        {
        GetMinSpaceRect(&rect, i);
        if (PtInRect(&rect, MAKEPOINT(lParam)))
          {
          SendMessage(hWnd, WM_COMMAND, ID_CHANGESPACE, MAKELONG(i,0));
          InvalidateRect(hWnd, NULL, FALSE);
          break;
          }
```

SCREENS.C, Fri 06/25/93 05:27 pm — Page 1

```
        }
      break;
      }

    case WM_RBUTTONDBLCLK:
      PostMessage(ghWndDashboard, WM_CONFIG, ghWndPanel, 0L);
      break;

    case WM_LBUTTONDOWN:
      if (gbInHelp)
        PostMessage(ghWndDashboard, WM_DISPLAYHELP, 0, HELP_SCREENS);
      break;

    case WM_REPAINT:
      InvalidateSpaceRect(NULL, wParam);
      break;

    case WM_WININICHANGE:
      {
      BOOL bColorChanged = TRUE;
      BOOL bDesktopChanged = TRUE;

      if (lParam != NULL)
        {
        if (lstrlen((LPSTR)lParam) > 0)
          {
          if (lstrcmpi((LPSTR)lParam, WININI_COLORS) != 0)
            bColorChanged = FALSE;

          else if (lstrcmpi((LPSTR)lParam, WININI_DESKTOP_SECTION) != 0)
            bDesktopChanged = FALSE;
          }
        }

      if (bColorChanged)
        GetSystemColorObjects();

      if ((bDesktopChanged) &&
         (gConfig.background == BACKGROUND_TYPE_WIN))
        LoadBackgrounds();

      if (ghWndRun != NULL)
        SendMessage(ghWndRun, msg, wParam, lParam);
      break;
      }

    case WM_COMMAND:
      switch (wParam)
        {
        case ID_CHANGESPACE:
          if ((int)LOWORD(lParam) == iCurrentSpace)
            break;

          if (HORIZONTAL)
            MoveAllWindows((SpaceOffset(LOWORD(lParam)) -
                    SpaceOffset(iCurrentSpace))*SX, 0, LOWORD(lParam));
          else
            MoveAllWindows(0, (SpaceOffset(LOWORD(lParam)) -
                    SpaceOffset(iCurrentSpace))*SY, LOWORD(lParam));
```

Page 2

```
            if (hWndButtons[iCurrentSpace] != NULL)
               {
               SetWindowWord(hWndButtons[iCurrentSpace], 0, BUTTON_OUT);
               InvalidateRect(hWndButtons[iCurrentSpace], NULL, FALSE);
               UpdateWindow(hWndButtons[iCurrentSpace]);
               }

            if (gConfig.displayMode == DISPLAYMODE_ICONIC)
               {
               GetMinSpaceRect(&rect, iCurrentSpace);
               InvalidateRect(ghWndPanel, &rect, FALSE);
               }

            if (hWndSpace != NULL)
               {
               GetSpaceRect(iCurrentSpace, hWndSpace, &rect);
               InvalidateSpaceRect(&rect, TRUE);
               }

            iCurrentSpace = LOWORD(lParam);
            RemapStickyApps();

            if (hWndButtons[iCurrentSpace] != NULL)
               {
               SetWindowWord(hWndButtons[iCurrentSpace], 0, BUTTON_IN);
               InvalidateRect(hWndButtons[iCurrentSpace], NULL, FALSE);
               UpdateWindow(hWndButtons[iCurrentSpace]);
               }

            if (gConfig.displayMode == DISPLAYMODE_ICONIC)
               {
               GetMinSpaceRect(&rect, iCurrentSpace);
               InvalidateRect(ghWndPanel, &rect, FALSE);

               /* This update needs to be done because if the space is being
                                                                            */
               /* changed from the keyboard, the space change must be painted
                                                                            */
               /* before returning from ID_CHANGESPACE.  The keyboard focus
                                                                            */
               /* rect is then painted on top of the updated display.
                                                                            */
               UpdateWindow(ghWndPanel);
               }

            if (hWndSpace != NULL)
               {
               GetSpaceRect(iCurrentSpace, hWndSpace, &rect);
               InvalidateSpaceRect(&rect, TRUE);
               UpdateSpaceWnd();
               }

            if (gbMinimized)
               {
               hDC = GetWindowDC(ghWndDashboard);
               if (hDC != NULL)
                  {
                  DrawMinimizedDisplay(hDC, ghWndDashboard);
                  ReleaseDC(ghWndDashboard, hDC);
                  }
```

SCREENS.C, Fri 06/25/93 05:27 pm Page 3

```
               }
            break; /* case ID_CHANGESPACE */

         case ID_CLOSEALL:
#if SUPPORT30
            if (gb30)
               SendMessage(ghWndPanel, WM_COMMAND, ID_UPDATESCREENS, 0L);
#endif

            CloseAllApps();

            break;

         case ID_SAVELAYOUT:
            #if SUPPORT30
            if (gb30)
               SendMessage(ghWndPanel, WM_COMMAND, ID_UPDATESCREENS, 0L);
            #endif

            SaveLayoutDlgBox(hWnd);
            break;

         case ID_MANAGELAYOUTS:
            ManageLayoutsDlgBox(hWnd);
            break;

         case ID_SHIFTWINDOWS:
            ShiftWindows((int)lParam);
            break;

         default:
            if ((wParam >= ID_LOADLAYOUT_START) && (wParam < ID_LOADLAYOUT_END
                                                                            ))
               {
               LoadLayout(wParam - ID_LOADLAYOUT_START);
               #if SUPPORT30
               if (gb30)
                  SendMessage(ghWndPanel, WM_COMMAND, ID_UPDATESCREENS, 0L);
               #endif
               }
            else if ((wParam >= ID_SWITCHWINDOW_START) &&
                     (wParam <= ID_SWITCHWINDOW_END))
               {
               /* Switch to the window's screen */
               lpTaskArray = (LPTASKARRAY)GlobalLock(ghTaskArray);
               if (lpTaskArray == NULL) break;

               i = wParam - ID_SWITCHWINDOW_START;

               /* Specifically for the OKNA Desktop which has a main window */
               /* with a bogus rect, the "real" application window is an    */
               /* owned popup.                                              */
               if (!RealRect(lpTaskArray[i].rect))
                  {
                  i = FindFirstOwnedPopup(lpTaskArray, lpTaskArray[i].hWnd);
                  if (i >= gNumTasks)
                     i = wParam - ID_SWITCHWINDOW_START;
                  }

               if (i < gNumTasks)
```

Page 4

```
                (
                if ((lpTaskArray[i].iSpace < 0) ||
                    (lpTaskArray[i].iSpace > gConfig.numScreens - 1))
                        ShiftWindows(i);
                SendMessage(hWnd, WM_COMMAND, ID_CHANGESPACE,
                                    MAKELONG(lpTaskArray[i].iSpace,0));

                /* This is done first because the sc_restore doesn't work
                                                                  unless */
                /* the DOS window (tty) has been activated first.
                                                                       */
                BringWindowToTop(lpTaskArray[i].hWnd);
                if (IsIconic(lpTaskArray[i].hWnd))
                    SendMessage(lpTaskArray[i].hWnd, WM_SYSCOMMAND,
                                                            SC_RESTORE, 0L);
                )
            GlobalUnlock(ghTaskArray);
            ) /* SWITCH_WINDOW */
        ) /* switch (wParam) */
    break;   /* WM_COMMAND */

    case WM_CHECKMSGQUEUE:
        (
        HANDLE hTempMsgQueue;
        LPSCREENSMSG lpTempMsgQueue;
        WORD tempMsgQueueCount;

        if (gNumScreensMsgs == 0) break;

        tempMsgQueueCount = gNumScreensMsgs;
        if (tempMsgQueueCount > MAX_MESSAGEQUEUE)
            tempMsgQueueCount = MAX_MESSAGEQUEUE;
        gNumScreensMsgs = 0;

        hTempMsgQueue = GlobalAlloc(GHND, sizeof(SCREENSMSG) *
                                                    tempMsgQueueCount);
        if (hTempMsgQueue == NULL) break;

        lpTempMsgQueue = (LPSCREENSMSG)GlobalLock(hTempMsgQueue);
        if (lpTempMsgQueue == NULL)
            (
            GlobalFree(hTempMsgQueue);
            break;
            )

        for (index = 0; index < tempMsgQueueCount; ++index)
            lpTempMsgQueue[index] = gScreensMsgQueue[index];

        for (index = 0; index < tempMsgQueueCount; ++index)
            (
            if (lpTempMsgQueue[index].message != WM_NOOP)
                SendMessage(ghWndPanel, lpTempMsgQueue[index].message,
                    lpTempMsgQueue[index].wParam, lpTempMsgQueue[index].lParam);
            )

        GlobalUnlock(hTempMsgQueue);
        GlobalFree(hTempMsgQueue);
        break;
        )
```

SCREENS.C, Fri 06/25/93 05:27 pm Page 5

```
    case WM_MOVEAPP:
        if (!MoveTaskWindows((HINSTANCE)lParam, wParam))
            AddToMoveWindowStruct((HINSTANCE)lParam, wParam);
        break;

    case WM_TASKMANAGER:
        TaskManagerDlgBox(ghWndDashboard);
        break;

    case WM_TASKADD:
        if (WindowFilter(wParam))
            (
            InitTaskInfo(taskInfo);
            GetTaskInfo(&taskInfo, wParam);
            ++gNumTasks;
            if (!AddNewTaskToList(&ghTaskArray, &ghSortArray, &taskInfo,
                                                                gNumTasks))
                (
                --gNumTasks;
                break;
                )

            SortWindowList();

            /* Check if it's ouside the visible screens.  If so, move it in */
            lpTaskArray = (LPTASKARRAY)GlobalLock(ghTaskArray);
            if (lpTaskArray == NULL) break;

            i = GetWindowIndex(lpTaskArray, wParam);

            if (i < gNumTasks)
                (
                ShiftWindows(i);

                if (RealRect(&lpTaskArray[i].rect))
                    InvalidateSpaceRect(&lpTaskArray[i].lilRect, FALSE);
                )
            GlobalUnlock(ghTaskArray);
            if (ghWndTaskman != NULL)
                PostMessage(ghWndTaskman, WM_UPDATETASKMANAGER, 0, 0L);
            )
        break;

    case WM_TASKACTIVE:
        if (hWndActive == GetActiveWindow()) break;

        lpTaskArray = (LPTASKARRAY)GlobalLock(ghTaskArray);
        if (lpTaskArray == NULL) break;

        oldActive = GetWindowIndex(lpTaskArray, hWndActive);
        SortWindowList();
        hWndActive = GetActiveWindow();
        newActive = GetWindowIndex(lpTaskArray, hWndActive);
        if (newActive < gNumTasks)
            (
            /* Change spaces if the new active window is in a different one */
            /* but don't change if the user clicked on a lil window in the  */
            /* virtual screen space (bMoving).                              */
            if ((lpTaskArray[newActive].iSpace != iCurrentSpace) &&
                (!bMoving) &&
```

Page 6

```
                    (!gDontSwitch) &&
                    (!lParam) &&
                    (lpTaskArray[newActive].windowType != WINDOWTYPE_NDWPOPUP) &&
                    (lpTaskArray[newActive].windowType != WINDOWTYPE_OFOTO) &&
                    (lpTaskArray[newActive].windowType != WINDOWTYPE_RANDOMHOUSE))
                   {
                   if ((lpTaskArray[newActive].iSpace < 0) ||
                       (lpTaskArray[newActive].iSpace > gConfig.numScreens - 1))
                         ShiftWindows(newActive);
                   SendMessage(hWnd, WM_COMMAND, ID_CHANGESPACE,
                                             MAKELONG(lpTaskArray[newActive].iSpace,0));
                   }
                 InvalidateSpaceRect(&lpTaskArray[newActive].lilRect, FALSE);
                 }
            if (oldActive < gNumTasks)
               /* If the active window wasn't found, we still want to repaint if
                                                                              say, */
               /* the dashboard is now active so no windows in the space wnd will
                                                                               be */
               /* active.
                                                                                  */
               {
               InvalidateSpaceRect(&lpTaskArray[oldActive].lilRect, FALSE);
               }
            GlobalUnlock(ghTaskArray);
            gTaskSwitching = FALSE;
            gDontSwitch = FALSE;
            break;

         case WM_TASKMIN:
            lpTaskArray = (LPTASKARRAY)GlobalLock(ghTaskArray);
            if (lpTaskArray == NULL) break;

            i = GetWindowIndex(lpTaskArray, wParam);
            if (i >= gNumTasks)
               {
               GlobalUnlock(ghTaskArray);
               break;
               }

            if (lpTaskArray[i].windowType != WINDOWTYPE_NDWHIDDEN)
               {
               GetWindowRect(wParam, &lpTaskArray[i].rect);
               AdjustIfNDW(&lpTaskArray[i]);
               MapOneRect(&lpTaskArray[i].lilRect, &lpTaskArray[i].rect);
               lpTaskArray[i].iSpace = SpaceFromX(&lpTaskArray[i].rect);
               }

            j = GetIconTitleWindow(lpTaskArray, wParam);
            if (j < gNumTasks)
               GetWindowRect(lpTaskArray[j].hWnd, &lpTaskArray[j].rect);

            GlobalUnlock(ghTaskArray);
            PostMessage(hWnd, WM_REPAINT, TRUE, 0L);
            if (ghWndTaskman != NULL)
               PostMessage(ghWndTaskman, WM_UPDATETASKMANAGER, 0, 0L);
            break;

         case WM_TASKMOVE:
            lpTaskArray = (LPTASKARRAY)GlobalLock(ghTaskArray);
```

SCREENS.C, Fri 06/25/93 05:27 pm Page 7

```
            if (lpTaskArray == NULL) break;

            i = GetWindowIndex(lpTaskArray, wParam);
            if (i >= gNumTasks)
               {
               GlobalUnlock(ghTaskArray);
               break;
               }

            InvalidateSpaceRect(&lpTaskArray[i].lilRect, TRUE);

            GetWindowRect(wParam, &lpTaskArray[i].rect);
            AdjustIfNDW(&lpTaskArray[i]);
            MapOneRect(&lpTaskArray[i].lilRect, &lpTaskArray[i].rect);
            lpTaskArray[i].iSpace = SpaceFromX(&lpTaskArray[i].rect);

            ValidateSpaceRect(&lpTaskArray[i].lilRect);
            UpdateSpaceWnd();
            InvalidateSpaceRect(&lpTaskArray[i].lilRect, FALSE);

            j = GetIconTitleWindow(lpTaskArray, wParam);
            if (j < gNumTasks)
               GetWindowRect(lpTaskArray[j].hWnd, &lpTaskArray[j].rect);

            GlobalUnlock(ghTaskArray);

            break;

         case WM_ICONMOVE:
            ProcessIconMove((HWND)wParam);
            break;

         case WM_CREATE:
            {
            ghWndPanel = hWnd;
            iCurrentSpace = gConfig.numScreens/2;

            GetSystemColorObjects();
            UpdateDashboardSettings();

            InitializeTaskManager(hWnd);
            gNumTasks = RKScreensTaskList(&ghTaskArray);
            SortWindowList();
            hWndActive = GetActiveWindow();

            hGreenPen = CreatePen(0, 1, RGB(0, 129, 128));
            hBlackPen = CreatePen(0, 1, RGB(0, 0, 0));

            LoadBackgrounds();

            GetClientRect(hWnd, &rect);
            if (RealRect(rect))
               {
               gbShown = TRUE;
               ShowWindow(hWnd, SW_SHOW);    /* This will also create hWndSpace */
               }
            else
               gbShown = FALSE;

            PostMessage(hWnd, WM_STARTUPLAYOUT, 0, 0L);
```

Page 8

```
            break;
            }

        case WM_STARTUPLAYOUT:
            /* Startup Layouts 2.0 */
                {
                for (i = 0; i < gNumLayouts; ++i)
                    if ((gLayoutList[i].startup) &&
                         ((GetAsyncKeyState(VK_SHIFT) & 0x8000) == 0))
                        LoadLayout(i);
                }
            break;

        case WM_SHOWWINDOW:
            if (wParam)
                {
                gbShown = TRUE;
                /* if hWndSpace != NULL, the space window was already created */
                /* so there's no need to recreate it.                         */
                /* if hWndSpace == NULL, the window was never created (the    */
                /* WM_CREATE code doesn't create it so ConfigurationChanged   */
                /* must be called to create it.                               */
                if (hWndSpace == NULL)
                    ConfigurationChanged();
                }
            else
                gbShown = FALSE;
            break;

        case WM_ERASEBKGND:
            {
            RECT dashboardRect;
            HBRUSH hBrush;

            GetWindowRect(ghWndDashboard, &dashboardRect);
            hBrush = GetDashBrush(PANEL_BRUSH);
            UnrealizeObject(hBrush);
            SetBrushOrg((HDC)wParam,
                        dashboardRect.left % 8,
                        dashboardRect.top % 8);

            GetClientRect(hWnd, &rect);
            FillRect((HDC)wParam, &rect, hBrush);
            break;
            }

        case WM_PAINT:
            hDC = BeginPaint(hWnd, &ps);
            if (hDC != NULL)
                {
                GetClientRect(hWnd, &rect);
                PaintPanel(hDC, hWnd, rect);
                }
            EndPaint(hWnd, &ps);
            break;

        case WM_DASHCLOSING:
            /* Restore all windows to the middle space */
            lpTaskArray = (LPTASKARRAY)GlobalLock(ghTaskArray);
```

SCREENS.C, Fri 06/25/93 05:27 pm — Page 9

```
            if (lpTaskArray == NULL) break;

            for (i = 0; i < gNumTasks; i++)
                {
                if (lpTaskArray[i].windowType == WINDOWTYPE_NDWHIDDEN)
                    {
                    RestoreNDW(lpTaskArray, i);
                    }
                else if (lpTaskArray[i].iSpace != iCurrentSpace)
                    {
                    if (HORIZONTAL)
                        MoveOneWindow(lpTaskArray[i].hWnd,
                                      &lpTaskArray[i].rect,
                                      (SpaceOffset(lpTaskArray[i].iSpace) -
                                                    SpaceOffset(iCurrentSpace))*SX,
                                      0);
                    else
                        MoveOneWindow(lpTaskArray[i].hWnd,
                                      &lpTaskArray[i].rect,
                                      0,
                                      (SpaceOffset(lpTaskArray[i].iSpace) -
                                                    SpaceOffset(iCurrentSpace))*SY);

                    /* The following MapOneRect and Invalidate still has to be done */
                    /* because we still might not close (if someone cancels in the  */
                    /* QUERYENDSESSION).  Currently, we get a WM_DASHCLOSING even   */
                    /* the close is cancelled.                                      */

                    MapOneRect(&lpTaskArray[i].lilRect, &lpTaskArray[i].rect);
                    InvalidateSpaceRect(NULL, TRUE);
                    lpTaskArray[i].iSpace = SpaceFromX(&lpTaskArray[i].rect);
                    }

                /* Windows off the top of the screen might not be accessible without */
                /* the Extended Screens so shift if necessary.                        */

                if (lpTaskArray[i].rect.top < 0)
                    {
                    SetWindowPos(lpTaskArray[i].hWnd, NULL,
                      lpTaskArray[i].rect.left, 0,
                      0, 0, SWP_NOSIZE | SWP_NOZORDER | SWP_NOACTIVATE);
                    GetWindowRect(lpTaskArray[i].hWnd, &lpTaskArray[i].rect);
                    MapOneRect(&lpTaskArray[i].lilRect, &lpTaskArray[i].rect);
                    InvalidateSpaceRect(NULL, TRUE);
                    }
                } /* for */

            GlobalUnlock(ghTaskArray);

            if (ghWndRun != NULL)
                {
                DestroyWindow(ghWndRun);
                SendMessage(ghWndDashboard, WM_DATACHANGED, ghWndPanel, 0L);
                }
            break;
```

Page 10

```
    case WM_DESTROY:
        /* Restore all windows to the middle space */
        lpTaskArray = (LPTASKARRAY)GlobalLock(ghTaskArray);
        if (lpTaskArray == NULL) break;

        for (i = 0; i < gNumTasks; i++)
            {
            if (lpTaskArray[i].windowType == WINDOWTYPE_NDWHIDDEN)
                {
                RestoreNDW(lpTaskArray, i);
                }
            else if (lpTaskArray[i].iSpace != iCurrentSpace)
                {
                if (HORIZONTAL)
                    MoveOneWindow(lpTaskArray[i].hWnd,
                                  &lpTaskArray[i].rect,
                                  (SpaceOffset(lpTaskArray[i].iSpace) -
                                          SpaceOffset(iCurrentSpace))*SX,
                                  0);
                else
                    MoveOneWindow(lpTaskArray[i].hWnd,
                                  &lpTaskArray[i].rect,
                                  0,
                                  (SpaceOffset(lpTaskArray[i].iSpace) -
                                          SpaceOffset(iCurrentSpace))*SY);

                lpTaskArray[i].iSpace = iCurrentSpace;
                }

            /* Windows off the top of the screen might not be accessible without
                                                                              */
            /* the Extended Screens so shift if necessary.
                                                                              */
            if ((lpTaskArray[i].rect.top < 0) &&
                (!IsZoomed(lpTaskArray[i].hWnd)))
                SetWindowPos(lpTaskArray[i].hWnd, NULL,
                    lpTaskArray[i].rect.left, 0,
                    0, 0, SWP_NOSIZE | SWP_NOZORDER | SWP_NOACTIVATE);
            }

        GlobalUnlock(ghTaskArray);

        if (gAnimationTimer != 0)
            KillTimer(ghWndPanel, gAnimationTimer);

        if (hFont != NULL) DeleteObject(hFont);
        if (hActivePen != NULL) DeleteObject(hActivePen);
        if (hGreenPen != NULL) DeleteObject(hGreenPen);
        if (hBlackPen != NULL) DeleteObject(hBlackPen);

        if (hInBrush != NULL) DeleteObject(hInBrush);
        if (hOutBrush != NULL) DeleteObject(hOutBrush);

        DeleteBackgrounds();

        break;

    default:
        if (msg == gDesktopChangeMsg)
            {
```

SCREENS.C, Fri 06/25/93 05:27 pm Page 11

```
            /* Assuming a WINDOWPOSCHANGED will come in and force the */
            /* spaces to be recreated with the correct size.          */
            SX = GetSystemMetrics(SM_CXSCREEN);
            SY = GetSystemMetrics(SM_CYSCREEN);
            RKScreensUpdate();
            }

        return DefWindowProc(hWnd, msg, wParam, lParam);
        break;
    }
 return 0L;
}

/*************************************************************************
  SpaceWndProc
 *************************************************************************/
long FAR PASCAL SpaceWndProc(HWND hWnd, WORD msg, WORD wParam, LONG lParam)
{
int             i;
HDC             hDC;
RECT            rect, iconRect;
PAINTSTRUCT     ps;
HFONT           hOldFont = NULL;
int             activeWindow;
RECT            textRect;
RECT            iRect;
RECT            clipRect;
HANDLE          hRectBrush;
HRGN            hTempRgn, hTextRgn, hOldRgn, hNewRgn, hIconRgn;
RECT            tempRect, oldLilRect;
LPTASKARRAY     lpTaskArray;
LPSORTARRAY     lpSortArray;
int             sortIndex;
int             dx, dy, j;
int             frameHeight, frameWidth;
long            style;
int             iWindow;

  switch (msg)
     {
     case WM_CREATE:
        GetClientRect(hWnd, &rect);
        MapWindowRects();
        break;

     case WM_PAINT:
        {
        int dt;

        hDC = BeginPaint(hWnd, &ps);
        if (hDC != NULL)
           {
           lpTaskArray = (LPTASKARRAY)GlobalLock(ghTaskArray);
           if (lpTaskArray == NULL)
              {
              EndPaint(hWnd, &ps);
              break;
              }

           lpSortArray = (LPSORTARRAY)GlobalLock(ghSortArray);
```

SCREENS.C page footer: Page 12

```
            if (lpSortArray == NULL)
               {
               EndPaint(hWnd, &ps);
               break;
               }

            GetClientRect(hWnd, &rect);

            if (bMoving)
               MapOneRect(&rect, &rOrg);
            else
               GetClientRect(hWnd, &rect);

            if (hFont != NULL)
               hOldFont = SelectObject(hDC, hFont);

            SelectObject(hDC, GetStockObject(NULL_BRUSH));
            activeWindow= -1;

            clipRect = ps.rcPaint;

            for (sortIndex = 0; sortIndex < gNumTasks; ++sortIndex)
               {
               i = lpSortArray[sortIndex].stackOrder;
               if ((i >= 0) && (i < gNumTasks))
                  {
                  if ((IsReallyVisible(&lpTaskArray[i])) &&
                      ((lpTaskArray[i].className[0] != '#') ||
                      (lstrcmp(lpTaskArray[i].className, "#32770") == 0)))
                     {
                     if (IntersectRect(&iRect, &lpTaskArray[i].lilRect, &clipRect
                                                                                ))
                        {
                        if (lpTaskArray[i].hWnd == hWndActive)
                           {
                           activeWindow = i;
                           if (hActivePen != NULL)
                              SelectObject(hDC, hActivePen);
                           hRectBrush = GetStockObject(WHITE_BRUSH);
                           SetBkColor(hDC, RGB(255, 255, 255));
                           }
                        else
                           {
                           hRectBrush = GetStockObject(LTGRAY_BRUSH);
                           if (!IsReallyIconic(&lpTaskArray[i]))
                              {
                              if (hGreenPen != NULL)
                                 SelectObject(hDC, hGreenPen);
                              }
                           else
                              SelectObject(hDC, GetStockObject(WHITE_PEN));
                           SetBkColor(hDC, RGB(192, 192, 192));
                           }

                        if (lpTaskArray[i].bSticky)
                           SelectObject(hDC, hBlackPen);

                        tempRect = lpTaskArray[i].lilRect;
                        if (!IsReallyIconic(&lpTaskArray[i]))
                           InflateRect(&tempRect, -1, -1);
```

```
                        hTempRgn = CreateRectRgnIndirect(&tempRect);

                        GetTextRect(hWnd,
                                    lpTaskArray[i].lilRect,
                                    lpTaskArray[i].szLilTitle,
                                    &textRect);
                        --textRect.right;
                        hTextRgn = CreateRectRgnIndirect(&textRect);
                        ++textRect.right;

                        /* Lil icons */
                        if ((!IsReallyIconic(&lpTaskArray[i])) &&
                           (gbShowIcons) &&
                           (lpTaskArray[i].iconBM))
                           {
                           iconRect = lpTaskArray[i].lilRect;
                           iconRect.top = textRect.bottom;
                           CenterLilIcon(&iconRect, &iconRect);
                           if (RealRect(iconRect))
                              {
                              hIconRgn = CreateRectRgnIndirect(&iconRect);
                              CombineRgn(hTempRgn, hTempRgn, hIconRgn, RGN_DIFF);
                              DeleteObject(hIconRgn);
                              }
                           }
                        else
                           iconRect.top = iconRect.left = iconRect.bottom =
                                                           iconRect.right = 0;

                        FillRgn(hDC, hTempRgn, hRectBrush);
                        DeleteObject(hTextRgn);
                        DeleteObject(hTempRgn);
                        Rectangle(hDC, lpTaskArray[i].lilRect.left, lpTaskArray[i
                                                            ].lilRect.top,
                              lpTaskArray[i].lilRect.right, lpTaskArray[i]
                                                            .lilRect.bottom);
                        if (!IsReallyIconic(&lpTaskArray[i]))
                           {
                           SetBkMode(hDC, TRANSPARENT);
                           if (textRect.right <= lpTaskArray[i].lilRect.right)
                              dt = DT_CENTER | DT_WORDBREAK | DT_NOPREFIX;
                           else
                              dt = DT_LEFT | DT_WORDBREAK | DT_NOPREFIX;

                           DrawText(hDC, lpTaskArray[i].szLilTitle, -1, &tempRect
                                                                           , dt);
                           if ((gbShowIcons) && (RealRect(iconRect)))
                              {
                              DrawLilIcon(hDC, iconRect, lpTaskArray[i].iconBM);
                              if (lpTaskArray[i].hWnd == hWndActive)
                                 DrawDropShadow(hDC, iconRect,
                                    GetStockObject(WHITE_PEN),
                                                   GetStockObject(BLACK_PEN));
                              else
                                 DrawDropShadow(hDC, iconRect,
                                    GetStockObject(WHITE_PEN),
                                                   GetStockObject(BLACK_PEN));
                              }
                           }
                        ExcludeClipRect(hDC, lpTaskArray[i].lilRect.left,
```

```
                                        lpTaskArray[i].lilRect.top,
                      lpTaskArray[i].lilRect.right, lpTaskArray[i]
                                                .lilRect.bottom);
                  } /* if IntersectRect */
               } /* if Visible */
            } /* if i > 0 && i < gNumTasks */
         } /* for */

      GetClientRect(hWnd, &tempRect);
      hTempRgn = CreateRectRgnIndirect(&tempRect);
      SelectClipRgn(hDC, hTempRgn);
      DeleteObject(hTempRgn);

      /* ...and finally, the frame for the current space */
      GetSpaceRect(iCurrentSpace, hWnd, &rect);

      Draw3DBox(hDC, rect, DASH_WHITE_PEN, DASH_BLACK_PEN,
                                             DASH_HOLLOW_BRUSH);

      if (hOldFont != NULL)
         SelectObject(hDC, hOldFont);

      GlobalUnlock(ghTaskArray);
      GlobalUnlock(ghSortArray);
      } /* if hDC != NULL */
   EndPaint(hWnd, &ps);
   break; /* WM_PAINT */
   }

case WM_RBUTTONDBLCLK:
   PostMessage(ghWndDashboard, WM_CONFIG, ghWndPanel, 0L);
   break;

case WM_ERASEBKGND:
   {
   BOOL paintSuccessful = FALSE;
   RECT rect;

   if (gConfig.background == BACKGROUND_TYPE_WIN)
      paintSuccessful = PaintWindowsBackground((HDC)wParam, hWnd);
   else if (gConfig.background == BACKGROUND_TYPE_FILE)
      {
      if (ghDIBBitmap != NULL)
         {
         GetClientRect(hWnd, &rect);
         paintSuccessful = TileBitmap((HDC)wParam, rect, ghDIBBitmap);
         }
      }
   else if (BackgroundIsABitmap(gConfig.background))
      paintSuccessful = PaintBitmapBackground((HDC)wParam, hWnd);
   else if (BackgroundIsAnimated(gConfig.background))
      paintSuccessful = PaintAnimatedBackground((HDC)wParam, hWnd);
   else
      paintSuccessful = PaintSolidBackground((HDC)wParam, hWnd);

   if (!paintSuccessful)
      {
      GetClientRect(hWnd, &rect);
      FillRect((HDC)wParam, &rect, GetDashBrush(PANEL_BRUSH));
      }
```

```
   break;
   }

case WM_DROPFILES:
   if ((HDROP)wParam != NULL)
      {
      ProcessDropFile(hWnd, (HDROP)wParam);
      return 0;
      }
   else
      return DefWindowProc(hWnd, msg, wParam, lParam);
   break;

case WM_DBDROPFILES:
   if (wParam != NULL)
      ProcessDBDropFile(hWnd, (HANDLE)wParam, MAKPOINT(lParam));
   break;

case WM_LBUTTONDOWN:
   {
   POINT pt, savedCursorPos;

   if (gbInHelp)
      {
      PostMessage(ghWndDashboard, WM_DISPLAYHELP, 0, HELP_SCREENS);
      break;
      }


   lpTaskArray = (LPTASKARRAY)GlobalLock(ghTaskArray);
   if (lpTaskArray == NULL) break;

   lpSortArray = (LPSORTARRAY)GlobalLock(ghSortArray);
   if (lpSortArray == NULL)
      {
      GlobalUnlock(ghTaskArray);
      break;
      }

   iWindow = IndexFromPoint(MAKEPOINT(lParam), lpTaskArray, lpSortArray);
   if (iWindow != -1)
     {
     if (IsWindow(lpTaskArray[iWindow].hWnd))
        {
        ghWndBeingMoved = lpTaskArray[iWindow].hWnd;
        if (lpTaskArray[iWindow].windowType != WINDOWTYPE_NDWHIDDEN)
           {
           /* In case the window has moved...*/
           GetWindowRect(lpTaskArray[iWindow].hWnd, &lpTaskArray[iWindow]
                                                               .rect);
           AdjustIfNDW(&lpTaskArray[iWindow]);
           MapOneRect(&lpTaskArray[iWindow].lilRect, &lpTaskArray[iWindow]
                                                               .rect);
           lpTaskArray[iWindow].iSpace = SpaceFromX(&lpTaskArray[iWindow]
                                                               .rect);
           }

        GetCursorPos(&pt);
        savedCursorPos = pt;
```

```
          if (!DashboardOnTop())
            #if SUPPORT30
              && (!gb30))
            #endif
            {

            SetWindowPos(ghWndDashboard,HWND_TOPMOST, 0, 0, 0, 0,
                         SWP_NOACTIVATE | SWP_NOMOVE | SWP_NOSIZE);
            gDontSwitch = TRUE;
            BringWindowToTop(lpTaskArray[iWindow].hWnd);
            SetWindowPos(ghWndDashboard,HWND_NOTOPMOST, 0, 0, 0, 0,
                         SWP_NOACTIVATE | SWP_NOMOVE | SWP_NOSIZE);
            }
          else
            {
            gDontSwitch = TRUE;
            SetWindowPos(lpTaskArray[iWindow].hWnd, HWND_TOP, 0, 0, 0, 0,
                         SWP_NOSIZE | SWP_NOMOVE);
            #if SUPPORT30
            if (gb30)
              SetWindowPos(ghWndDashboard, HWND_TOP, 0, 0, 0, 0,
                           SWP_NOACTIVATE | SWP_NOMOVE | SWP_NOSIZE);
            #endif
            }

          GetCursorPos(&pt);
          if ((savedCursorPos.x != pt.x) || (savedCursorPos.y != pt.y))
            SetCursorPos(savedCursorPos.x, savedCursorPos.y);

          if ((lstrcmp(lpTaskArray[iWindow].className, CLASSNAME_ICONTITLE) !=
                                                                          0) &&
              (lpTaskArray[iWindow].windowType != WINDOWTYPE_NDWPOPUP) &&
              (lpTaskArray[iWindow].windowType != WINDOWTYPE_CPDT))
          if (IsAUserMoveableWindow(&lpTaskArray[iWindow]))
            {
            CopyRect(&rOrg, &lpTaskArray[iWindow].lilRect);
            bMoving = TRUE;
            SetCapture(hWnd);
            GetWindowRect(hWndSpace, &rect);
            InflateRect(&rect, -2, -2);
            ClipCursor(&rect);
            ptOrg = MAKEPOINT(lParam);
            } /* if !iconic */
          } /* if IsWindow */
        }

        GlobalUnlock(ghTaskArray);
        GlobalUnlock(ghSortArray);
        break;
        }

    case WM_LBUTTONUP:
        if (bMoving)
          {
          ReleaseCapture();
          ClipCursor(NULL);
          bMoving = FALSE;

          lpTaskArray = (LPTASKARRAY)GlobalLock(ghTaskArray);
          if (lpTaskArray == NULL) break;
```

SCREENS.C, Fri 06/25/93 05:27 pm Page 17

```

          iWindow = GetWindowIndex(lpTaskArray, ghWndBeingMoved);
          if (iWindow < gNumTasks)
            {
            lpTaskArray[iWindow].iSpace = SpaceFromX(&lpTaskArray[iWindow]
                                                                    .rect);

            if (((lpTaskArray[iWindow].windowType == WINDOWTYPE_NDW) ||
                 (lpTaskArray[iWindow].windowType == WINDOWTYPE_NDWHIDDEN)) &&
                 (!IsReallyIconic(&lpTaskArray[iWindow])))
              {
              hOldRgn = CreateRectRgnIndirect(&lpTaskArray[iWindow].lilRect);
              SnapNDW(lpTaskArray, iWindow);

              [illegible]Rect(&lpTaskArray[iWindow].lilRect, &lpTaskArray[iWindow]
                                                                    .rect);
              hNewRgn = CreateRectRgnIndirect(&lpTaskArray[iWindow].lilRect);

              j = CombineRgn(hOldRgn, hOldRgn, hNewRgn, RGN_DIFF);
              InvalidateSpaceRgn(hOldRgn, TRUE);
              UpdateSpaceWnd();

              InvalidateSpaceRect(&lpTaskArray[iWindow].lilRect, FALSE);

              if (hOldRgn != NULL) DeleteObject(hOldRgn);
              if (hNewRgn != NULL) DeleteObject(hNewRgn);

              MoveNDWPopups(lpTaskArray, lpTaskArray[iWindow].iSpace);
              }
            else if ((!IsZoomed(lpTaskArray[iWindow].hWnd)) &&
                   (lpTaskArray[iWindow].rect.right - lpTaskArray[iWindow]
                                                      .rect.left >= SX) &&
                   (lpTaskArray[iWindow].rect.bottom - lpTaskArray[iWindow]
                                                        .rect.top >= SY))
              {
              if (lpTaskArray[iWindow].iSpace < 0)
                lpTaskArray[iWindow].iSpace = 0;
              else if (lpTaskArray[iWindow].iSpace > gConfig.numScreens - 1)
                lpTaskArray[iWindow].iSpace = gConfig.numScreens - 1;

              /* set i to the left point of the window's space */
              if (HORIZONTAL)
                i = (SpaceOffset(iCurrentSpace) - SpaceOffset(lpTaskArray[iW
                                                     indow].iSpace)) * SX;
              else
                i = (SpaceOffset(iCurrentSpace) - SpaceOffset(lpTaskArray[iW
                                                     indow].iSpace)) * SY;

              style = GetWindowLong(lpTaskArray[iWindow].hWnd, GWL_STYLE);
              if (style & WS_THICKFRAME)
                {
                frameWidth = GetSystemMetrics(SM_CXFRAME);
                frameHeight = GetSystemMetrics(SM_CYFRAME);
                }
              else
                {
                frameWidth = GetSystemMetrics(SM_CXBORDER);
                frameHeight = GetSystemMetrics(SM_CYFRAME);
                }
```

SCREENS.C Page 18

```
                hOldRgn = CreateRectRgnIndirect(&lpTaskArray[iWindow].lilRect);

                if (HORIZONTAL)
                   OffsetRect(&lpTaskArray[iWindow].rect,
                              i - lpTaskArray[iWindow].rect.left - frameWidth,
                              0 - lpTaskArray[iWindow].rect.top - frameHeight);
                else
                   OffsetRect(&lpTaskArray[iWindow].rect,
                              0 - lpTaskArray[iWindow].rect.left - frameWidth,
                              i - lpTaskArray[iWindow].rect.top - frameHeight);

                SetWindowPos(lpTaskArray[iWindow].hWnd,
                         NULL,
                         lpTaskArray[iWindow].rect.left,
                         lpTaskArray[iWindow].rect.top,
                         0, 0,
                         SWP_NOACTIVATE | SWP_NOSIZE | SWP_NOZORDER);
                MapOneRect(&lpTaskArray[iWindow].lilRect, &lpTaskArray[iWindow]
                                                                        .rect);

                hNewRgn = CreateRectRgnIndirect(&lpTaskArray[iWindow].lilRect);

                j = CombineRgn(hOldRgn, hOldRgn, hNewRgn, RGN_DIFF);
                InvalidateSpaceRgn(hOldRgn, TRUE);
                UpdateSpaceWnd();

                InvalidateSpaceRect(&lpTaskArray[iWindow].lilRect, FALSE);

                if (hOldRgn != NULL) DeleteObject(hOldRgn);
                if (hNewRgn != NULL) DeleteObject(hNewRgn);

                } /* if Zoomed */
             else
                {
                /* Icon Move enhancement 2.0 */
                if (IsReallyIconic(&lpTaskArray[iWindow]))
                   {
                   i = GetIconTitleWindow(lpTaskArray, lpTaskArray[iWindow]
                                                                        .hWnd);
                   if (i < gNumTasks)
                      {
                      GetWindowRect(lpTaskArray[iWindow].hWnd, &rect);
                      OffsetRect(&lpTaskArray[i].rect,
                         lpTaskArray[iWindow].rect.left - rect.left,
                         lpTaskArray[iWindow].rect.top - rect.top);
                      SetWindowPos(lpTaskArray[i].hWnd,
                         0,
                         lpTaskArray[i].rect.left,
                         lpTaskArray[i].rect.top,
                         0,
                         0,
                         SWP_NOSIZE | SWP_NOZORDER | SWP_NOACTIVATE);
                      }
                   }
                SetWindowPos(lpTaskArray[iWindow].hWnd,
                   0,
                   lpTaskArray[iWindow].rect.left,
                   lpTaskArray[iWindow].rect.top,
                   0,
                   0,
```

```
                   SWP_NOSIZE | SWP_NOZORDER | SWP_NOACTIVATE);

                if (IsReallyIconic(&lpTaskArray[iWindow]))
                   InvalidateRect(lpTaskArray[iWindow].hWnd, NULL, TRUE);
                }
             }
          ghWndBeingMoved = NULL;
          GlobalUnlock(ghTaskArray);
          }
       break;

    case WM_LBUTTONDBLCLK:
       if (gbInHelp) break; /* Help invoked on 1st click, ignore 2nd */

       #ifdef GB30
       if (gb30)
          SendMessage(ghWndPanel, WM_COMMAND, ID_UPDATESCREENS, 0L);
       #endif

       lpTaskArray = (LPTASKARRAY)GlobalLock(ghTaskArray);
       if (lpTaskArray == NULL) break;

       lpSortArray = (LPSORTARRAY)GlobalLock(ghSortArray);
       if (lpSortArray == NULL) break;

       iWindow = IndexFromPoint(MAKEPOINT(lParam), lpTaskArray, lpSortArray);

       /* If a app mini-window was dbl clicked on, switch to this app */
       /* (this will take care moving to the app's screen)...          */
       if (iWindow != -1)
          {
          if (IsWindow(lpTaskArray[iWindow].hWnd))
             {
             SendMessage(ghWndPanel, WM_COMMAND, ID_SWITCHWINDOW_START +
                                                             iWindow, 0L);
             }
          }
       /* ...otherwise, just switch to the space that was dbl clicked in */
       else
          {
          if (HORIZONTAL)
             i = LOWORD(lParam) / dxScreen;
          else
             i = HIWORD(lParam) / dyScreen;

          SendMessage(ghWndPanel, WM_COMMAND, ID_CHANGESPACE, MAKELONG(i,0));
          }

       GlobalUnlock(ghTaskArray);
       GlobalUnlock(ghSortArray);
       break;

    case WM_SETCURSOR:
       if (gbInHelp)
          {
          SendMessage(ghWndDashboard, msg, wParam, lParam);
          break;
          }
       return DefWindowProc(hWnd, msg, wParam, lParam);
       break;
```

```
    default:
        if (msg == gQueryDropFilesMsg) return(TRUE);
        return DefWindowProc(hWnd, msg, wParam, lParam);
        break;
    }
  return 0L;
}

/************************************************************************
  ProcessDropFile
      Will execute the applications passed in from a WM_DROPFILE message.
*************************************************************************/
VOID NEAR PASCAL ProcessDropFile(HWND hWnd, HDROP hDrop)
{
UINT numFiles, i;
int space;
BYTE filename[MAXFILEPATH + 1];
POINT pt;
HINSTANCE hInst;
UINT newNumWindows, oldNumWindows;
HANDLE hNewWindowList, hOldWindowList;
HWND newhWnd;
TASKARRAY tempTaskInfo;

numFiles = DragQueryFile(hDrop, (WORD)-1, NULL, NULL);
if (numFiles == 0) return;

if (DragQueryPoint(hDrop, &pt) != 0)
  {
  hOldWindowList = GetWindowList(&oldNumWindows);

  if (HORIZONTAL)
    space = pt.x / dxScreen;
  else
    space = pt.y / dyScreen;

  /* should not be necessary, but just in case. */
  if (space < 0) space = 0;
  else if (space >= gConfig.numScreens) space = gConfig.numScreens - 1;

  for (i = 0; i < numFiles; ++i)
    {
    if (DragQueryFile(hDrop, i, filename, sizeof(filename)) > 0)
      {
      /* If RKExec fails, FindNewWindow should just return NULL */
      hInst = RKExec(filename, NULL, SW_SHOWNORMAL, ghWndPanel, NULL, TRUE);

      hNewWindowList = GetWindowList(&newNumWindows);
      newhWnd = FindNewWindow(hNewWindowList, newNumWindows,
                              hOldWindowList, oldNumWindows,
                              NULL);
      if (newhWnd != NULL)
        {
        InitTaskInfo(tempTaskInfo);
        GetTaskInfo(&tempTaskInfo, newhWnd);
        if (!tempTaskInfo.bSticky)
          MoveWindowToSpace(newhWnd, space);
        else
          MoveWindowToSpace(newhWnd, iCurrentSpace);
```

SCREENS.C, Fri 06/25/93 05:27 pm Page 21

```
          FreeTaskBitmap(&tempTaskInfo);
          }
        else
          tempTaskInfo.bSticky = FALSE;

        if ((hInst >= HINSTANCE_ERROR) &&
            (!tempTaskInfo.bSticky))
          PostScreensMsg(WM_MOVEAPP, space, (LONG)hInst);

        GlobalFree(hOldWindowList);
        hOldWindowList = hNewWindowList;
        oldNumWindows = newNumWindows;
        }
      } /* for numFiles */
    GlobalFree(hOldWindowList);
  }
DragFinish(hDrop);
}

/************************************************************************
  ProcessDBDropFile
      Will execute the applications passed in from a WM_DBDROPFILE message.
*************************************************************************/
VOID NEAR PASCAL ProcessDBDropFile(HWND hWnd, HANDLE hDBDrop, POINT pt)
{
WORD i;
int space, cmdShow;
LPDB_DROPINFO lpDBDropInfo;
HINSTANCE hInst;
UINT newNumWindows, oldNumWindows;
HANDLE hNewWindowList, hOldWindowList;
HWND newhWnd;
TASKARRAY tempTaskInfo;

if (hDBDrop == NULL)
return;

lpDBDropInfo = (LPDB_DROPINFO)GlobalLock(hDBDrop);
if (lpDBDropInfo == NULL)
  {
  GlobalFree(hDBDrop);
  return;
  }

hOldWindowList = GetWindowList(&oldNumWindows);

if (HORIZONTAL)
  space = pt.x / dxScreen;
else
  space = pt.y / dyScreen;

/* should not be necessary, but just in case. */
if (space < 0) space = 0;
else if (space >= gConfig.numScreens) space = gConfig.numScreens - 1;

for (i = 0; i < lpDBDropInfo->wNumApps; ++i)
  {
  if (lpDBDropInfo->dbAppInfo[i].bRunMin)
    cmdShow = SW_SHOWMINNOACTIVE;
  else
```

Page 22

```
   cmdShow = SW_SHOWNORMAL;

   /* If RkExec fails, FindNewWindow should just return NULL */
   hInst = RKExec(lpDBDropInfo->dbAppInfo[i].szCommand,
            lpDBDropInfo->dbAppInfo[i].szWorkingDir,
            cmdShow,
            ghWndPanel,
            NULL,
            TRUE);

   hNewWindowList = GetWindowList(&newNumWindows);
   newhWnd = FindNewWindow(hNewWindowList, newNumWindows,
                     hOldWindowList, oldNumWindows,
                     NULL);

   if (newhWnd != NULL)
      {
      InitTaskInfo(tempTaskInfo);
      GetTaskInfo(&tempTaskInfo, newhWnd);
      if (!tempTaskInfo.bSticky)
         MoveWindowToSpace(newhWnd, space);
      else
         MoveWindowToSpace(newhWnd, iCurrentSpace);
      FreeTaskBitmap(&tempTaskInfo);
      }
   else
      tempTaskInfo.bSticky = FALSE;

   if ((hInst >= HINSTANCE_ERROR) &&
      (!tempTaskInfo.bSticky))
      PostScreensMsg(WM_MOVEAPP, space, (LONG)hInst);

   GlobalFree(hOldWindowList);
   hOldWindowList = hNewWindowList;
   oldNumWindows = newNumWindows;
   } /* for numFiles */

GlobalFree(hOldWindowList);
GlobalUnlock(hDBDrop);
GlobalFree(hDBDrop);
}

/*************************************************************************
   MoveWindowToSpace
      Will move "hWnd" so that it is in "space".
*************************************************************************/
VOID NEAR PASCAL MoveWindowToSpace(HWND hWnd, int space)
{
RECT rect, lilRect;
int appSpace;

GetWindowRect(hWnd, &rect);
MapOneRect(&lilRect, &rect);
InvalidateSpaceRect(&lilRect, TRUE);

appSpace = SpaceFromX(&rect);

if (HORIZONTAL)
   OffsetRect(&rect, (SpaceOffset(appSpace) - SpaceOffset(space))*SX, 0);
else
   OffsetRect(&rect, 0, (SpaceOffset(appSpace) - SpaceOffset(space))*SY);

MapOneRect(&lilRect, &rect);
InvalidateSpaceRect(&lilRect, FALSE);

MoveWindow(hWnd,
         rect.left,
         rect.top,
         rect.right - rect.left,
         rect.bottom - rect.top,
         TRUE);

if (IsIconic(hWnd))
   PostScreensMsg(WM_ICONMOVE, hWnd, 0L);
}

/*************************************************************************
   TestHotKey
*************************************************************************/
BOOL FAR PASCAL TestHotKey(WORD wCode)
{
int i, topmost;

for (i = 0; i < gConfig.numScreens; ++i)
   if (gConfig.hotkeys[i] == wCode)
      {
      #if SUPPORT30
      if (gb30)
         SendMessage(ghWndPanel, WM_COMMAND, ID_UPDATESCREENS, 0L);
      #endif

      topmost = FindTopmostInScreen(i);
      if (topmost < gNumTasks)
         PostMessage(ghWndPanel, WM_COMMAND, ID_SWITCHWINDOW_START + topmost, 0L
                                                                        );
      else
         PostMessage(ghWndPanel, WM_COMMAND, ID_CHANGESPACE, MAKELONG(i, 0));
      return TRUE;
      }
return FALSE;
}

/*************************************************************************
   MoveAllWindows
      Will move all application windows so that "newScreen" is the current
                                                                     screen
*************************************************************************/
void FAR PASCAL MoveAllWindows(int xOffset, int yOffset, int newScreen)
{
int i;
LPTASKARRAY lpTaskArray;
HDWP hDeferWindowPos;

lpTaskArray = (LPTASKARRAY)GlobalLock(ghTaskArray);
if (lpTaskArray == NULL) return;

hDeferWindowPos = BeginDeferWindowPos(gNumTasks);
if (hDeferWindowPos == NULL)
   {
   GlobalUnlock(ghTaskArray);
```

```
   return;
   }

/* First move the windows that are in the new screen */
for (i = 0; i < gNumTasks; i++)
   {
   if ((IsWindow(lpTaskArray[i].hWnd)) &&
      (lpTaskArray[i].iSpace == newScreen))
      {
      if (lpTaskArray[i].windowType == WINDOWTYPE_NDWHIDDEN)
         {
         OffsetRect(&lpTaskArray[i].rect, xOffset, yOffset);
         RestoreNDW(lpTaskArray, i);
         }
      else if (IsAMoveableWindow(&lpTaskArray[i]))
         {
         OffsetRect(&lpTaskArray[i].rect, xOffset, yOffset);
         if (hDeferWindowPos != NULL)
            hDeferWindowPos = DeferWindowPos(hDeferWindowPos,
                                    lpTaskArray[i].hWnd,
                                    NULL,
                                    lpTaskArray[i].rect.left,
                                    lpTaskArray[i].rect.top,
                                    0, 0,
                                    SWP_NOACTIVATE | SWP_NOZORDER | SWP_NOSIZE);
         if (IsIconic(lpTaskArray[i].hWnd))
            PostScreensMsg(WM_ICONMOVE,lpTaskArray[i].hWnd, 0L);
//          MoveOneWindow(lpTaskArray[i].hWnd, &lpTaskArray[i].rect, xOffset,
                                                                    yOffset);
         }
      }
   }

  /* ...and then move all the rest */
for (i = 0; i < gNumTasks; i++)
   {
   if ((IsWindow(lpTaskArray[i].hWnd)) &&
      (lpTaskArray[i].iSpace != newScreen))
      {
      if ((lpTaskArray[i].windowType == WINDOWTYPE_NDW) &&
         (!IsIconic(lpTaskArray[i].hWnd)))
         {
         OffsetRect(&lpTaskArray[i].rect, xOffset, yOffset);
         HideNDW(lpTaskArray, i);
         }
      else if (IsAMoveableWindow(&lpTaskArray[i]))
         {
         OffsetRect(&lpTaskArray[i].rect, xOffset, yOffset);
         if (hDeferWindowPos != NULL)
            hDeferWindowPos = DeferWindowPos(hDeferWindowPos,
                                    lpTaskArray[i].hWnd,
                                    NULL,
                                    lpTaskArray[i].rect.left,
                                    lpTaskArray[i].rect.top,
                                    0, 0,
                                    SWP_NOACTIVATE | SWP_NOZORDER | SWP_NOSIZE);
         if (IsIconic(lpTaskArray[i].hWnd))
            PostScreensMsg(WM_ICONMOVE,lpTaskArray[i].hWnd, 0L);
//          MoveOneWindow(lpTaskArray[i].hWnd, &lpTaskArray[i].rect, xOffset,
                                                                    yOffset);
```

SCREENS.C, Fri 06/25/93 05:27 pm Page 25

```
         }
      }
   }

EndDeferWindowPos(hDeferWindowPos);

GlobalUnlock(ghTaskArray);
}

/****************************************************************************
   ConfigDlgProc
 ****************************************************************************/
BOOL FAR PASCAL ConfigDlgProc(hDlg, message, wParam, lParam)
HWND  hDlg;
WORD  message;
WORD  wParam;
LONG  lParam;
{
int i;
int newNumScreens;
LPTASKARRAY lpTaskArray;

  switch (message)
     {
     case WM_INITDIALOG:
        {
        DB_ROLODEXINFO dbInfo;

        gbInit = TRUE;
        gCurrentPref = ID_CONFIGGENERAL_CC;

        dbInfo.hWnd = hDlg;
        dbInfo.nControlsPerRow = 3;
        dbInfo.nCurrentID = gCurrentPref;
        dbInfo.nFirstControl = ID_CONFIGGENERAL_CC;
        dbInfo.nFirstID = ID_CONFIGGENERAL_CC;
        dbInfo.nLastControl = ID_CONFIGSTICKY_CC;
        dbInfo.nLastID = ID_CONFIGSTICKY_CC;

        DB_RolodexInit(&dbInfo);

        if (dxScreen == 0)
           CalcScreenSizes();

        UpdateMaxScreensRB(hDlg);

        SetupConfigDlg(hDlg);
        InitHotkeysEB(hDlg);

        i = ID_NUMSCREENS0_CB + gConfig.numScreens / 2;
        SendDlgItemMessage(hDlg, i, BM_SETCHECK, 1, 0L);

        FillStickyAppsLB(GetDlgItem(hDlg, ID_STICKY_LB), FALSE);
        FillPredefinedBackgroundsCB(GetDlgItem(hDlg, ID_BACKGROUNDRC_CB));
        SendDlgItemMessage(hDlg, ID_BACKGROUNDFILE_EB, EM_LIMITTEXT, MAXFILEPATH
                                                                        , 0L);

        if (gConfig.background == BACKGROUND_TYPE_WIN)
           {
           SendDlgItemMessage(hDlg, ID_BACKGROUNDRC_CB, CB_SETCURSEL,
```

SCREENS.C Page 26

```
                                                            BACKGROUND_SKY, 0L);
            CheckDlgButton(hDlg, ID_BACKGROUNDWIN_RB, 1);
            }
        else if (gConfig.background == BACKGROUND_TYPE_FILE)
            {
            SendDlgItemMessage(hDlg, ID_BACKGROUNDRC_CB, CB_SETCURSEL,
                                                            BACKGROUND_SKY, 0L);
            CheckDlgButton(hDlg, ID_BACKGROUNDFILE_RB, 1);
            SetDlgItemText(hDlg, ID_BACKGROUNDFILE_EB, gConfig.bitmap);
            }
        else
            {
            SendDlgItemMessage(hDlg, ID_BACKGROUNDRC_CB, CB_SETCURSEL,
                                                        gConfig.background, 0L);
            CheckDlgButton(hDlg, ID_BACKGROUNDRC_RB, 1);
            }
        if (gConfig.displayMode == DISPLAYMODE_NORMAL)
            CheckDlgButton(hDlg, ID_NORMAL_RB, 1);
        else
            CheckDlgButton(hDlg, ID_ICONIC_RB, 1);

        UpdateConfigButtons(hDlg);
        gbInit = FALSE;
        return 0;
        break;
        }

    case WM_HOTKEYCHANGE:
        {
        HWND hWndFocus;
        WORD id;

        hWndFocus = GetFocus();
        if (hWndFocus != NULL)
            {
            id = GetWindowWord(hWndFocus, GWW_ID);
            if ((id >= ID_HOTKEYS0_EB) && (id < ID_HOTKEYS0_EB + MAX_SCREENS))
                {
                gConfig.hotkeys[id - ID_HOTKEYS0_EB] = wParam;
                SendMessage(ghWndDashboard, WM_CONFIGCHANGED, ghWndPanel, 0L);
                }
            }
        break;
        }

    case WM_COMMAND:
        if ((wParam >= ID_COLORFIRST_BT) && (wParam <= ID_COLORLAST_BT))
            {
            InvalidateRect(GetDlgItem(hDlg, gConfig.background + ID_COLORFIRST_BT)
                                                                                ,
                        NULL, FALSE);
            gConfig.background = wParam - ID_COLORFIRST_BT;
            InvalidateRect(GetDlgItem(hDlg, wParam), NULL, FALSE);
            LoadBackgrounds();
            SendMessage(ghWndDashboard, WM_CONFIGCHANGED, ghWndPanel, 0L);
            InvalidateSpaceRect(NULL, TRUE);
            }
        else if (wParam == ID_BACKGROUNDRC_CB)
            {
            WORD w;
```

```
            if (HIWORD(lParam) == CBN_SELCHANGE)
                {
                w = (WORD)SendDlgItemMessage(hDlg, ID_BACKGROUNDRC_CB, CB_GETCURSEL
                                                                        , 0, 0L);
                if ((w != CB_ERR) && (gConfig.background != w))
                    {
                    gConfig.background = w;
                    LoadBackgrounds();
                    SendMessage(ghWndDashboard, WM_CONFIGCHANGED, ghWndPanel, 0L);
                    InvalidateSpaceRect(NULL, TRUE);
                    }
                UpdateConfigButtons(hDlg);
                }
            } /* Predefined backgrounds */
        else if (wParam == ID_BACKGROUNDRC_RB)
            {
            if (IsDlgButtonChecked(hDlg, ID_BACKGROUNDRC_RB))
                {
                PostMessage(hDlg, WM_COMMAND, ID_BACKGROUNDRC_CB, MAKELONG(0,
                                                            CBN_SELCHANGE));
                SendMessage(ghWndDashboard, WM_CONFIGCHANGED, ghWndPanel, 0L);
                CheckRadioButton(hDlg, ID_BACKGROUNDRC_RB, ID_BACKGROUNDFILE_RB,
                                                        ID_BACKGROUNDRC_RB);
                }
            UpdateConfigButtons(hDlg);
            }
        else if (wParam == ID_BACKGROUNDWIN_RB)
            {
            if (IsDlgButtonChecked(hDlg, ID_BACKGROUNDWIN_RB))
                {
                gConfig.background = (WORD)BACKGROUND_TYPE_WIN;
                LoadBackgrounds();
                SendMessage(ghWndDashboard, WM_CONFIGCHANGED, ghWndPanel, 0L);
                InvalidateSpaceRect(NULL, TRUE);
                CheckRadioButton(hDlg, ID_BACKGROUNDRC_RB, ID_BACKGROUNDFILE_RB,
                                                        ID_BACKGROUNDWIN_RB);
                }
            UpdateConfigButtons(hDlg);
            }
        else if (wParam == ID_BACKGROUNDFILE_RB)
            {
            if (IsDlgButtonChecked(hDlg, ID_BACKGROUNDFILE_RB))
                {
                gConfig.background = (WORD)BACKGROUND_TYPE_FILE;
                SendMessage(ghWndDashboard, WM_CONFIGCHANGED, ghWndPanel, 0L);
                CheckConfig(hDlg, FALSE);
                CheckRadioButton(hDlg, ID_BACKGROUNDRC_RB, ID_BACKGROUNDFILE_RB,
                                                        ID_BACKGROUNDFILE_RB);
                }
            UpdateConfigButtons(hDlg);
            }
        else if (wParam == ID_ADDSTICKY_BT)
            {
            if (AddStickyDlgBox(hDlg))
                {
                ResetSticky();
                InvalidateSpaceRect(NULL, FALSE);
                FillStickyAppsLB(GetDlgItem(hDlg, ID_STICKY_LB), TRUE);
                UpdateConfigButtons(hDlg);
```

```
                RemapStickyApps();
                }
            }
        else if (wParam == ID_DELETESTICKY_BT)
            {
            int lbIndex;

            lbIndex = (int)SendDlgItemMessage(hDlg, ID_STICKY_LB, LB_GETCURSEL, 0,
                                                                              0L);
            if (lbIndex >= 0)
                {
                i = (int)SendDlgItemMessage(hDlg, ID_STICKY_LB, LB_GETITEMDATA,
                                                                       lbIndex, 0L);
                if (i >= 0)
                    {
                    DeleteStickyApp(i);
                    FillStickyAppsLB(GetDlgItem(hDlg, ID_STICKY_LB), TRUE);
                    UpdateConfigButtons(hDlg);
                    ResetSticky();
                    InvalidateSpaceRect(NULL, FALSE);
                    }
                }
            }
        else if (wParam == ID_STICKY_LB)
            {
            UpdateConfigButtons(hDlg);
            }
        else if (wParam == ID_BACKGROUNDFILE_EB)
            {
            if ((HIWORD(lParam) == EN_CHANGE) &&
                 (!gbInit))
                {
                SendMessage(ghWndDashboard, WM_CONFIGCHANGED, ghWndPanel, 0L);
                }
            }
        else if (wParam == ID_BACKGROUNDBROWSE_BT)
            {
            BYTE filename[MAXFILEPATH + 1];
            BYTE initialDir[MAXFILEPATH + 1];

            GetDlgItemText(hDlg, ID_BACKGROUNDFILE_EB, initialDir,
                                                                sizeof(initialDir));
            if (DB_Browse(hDlg, filename, initialDir, BROWSE_BMP))
                {
                SetDlgItemText(hDlg, ID_BACKGROUNDFILE_EB, filename);
                CheckConfig(hDlg, FALSE);
                }
            }
        else if (wParam == ID_NORMAL_RB)
            {
            LONG ret;
            int maxScreens;

            if (IsDlgButtonChecked(hDlg, ID_NORMAL_RB))
                {
                if (gbShown)
                    ret = SendMessage(ghWndDashboard, WM_CALCMAXPANELSIZE,
                                                                  ghWndPanel, 0L);
                else
                    ret = SendMessage(ghWndDashboard, WM_CALCMAXPANELSIZE, NULL, 0L)
```

SCREENS.C, Fri 06/25/93 05:27 pm Page 29

```
                gConfig.displayMode = DISPLAYMODE_NORMAL;
                maxScreens = CalcMaxScreens(LOWORD(ret), HIWORD(ret));
                if (maxScreens < gConfig.numScreens)
                    {
                    gConfig.displayMode = DISPLAYMODE_ICONIC;
                    ER_DisplayError(NULL, ghInst, ERR_NORMALMODE, ST_SCREENSPREFIX,
                        MB_APPLMODAL | MB_ICONEXCLAMATION | MB_OK);
                    CheckRadioButton(hDlg, ID_NORMAL_RB, ID_ICONIC_RB, ID_ICONIC_RB)
                                                                                   ;
                    break;
                    }
                SendMessage(ghWndDashboard, WM_LAYOUT, ghWndPanel, 1L);
                SendMessage(ghWndDashboard, WM_CONFIGCHANGED, ghWndPanel, 0L);
                ConfigurationChanged();
                UpdateMaxScreensRB(hDlg);
                }
            }
        else if (wParam == ID_ICONIC_RB)
            {
            if (IsDlgButtonChecked(hDlg, ID_ICONIC_RB))
                {
                gConfig.displayMode = DISPLAYMODE_ICONIC;
                DestroySpaces();
                SendMessage(ghWndDashboard, WM_LAYOUT, ghWndPanel, 1L);
                SendMessage(ghWndDashboard, WM_CONFIGCHANGED, ghWndPanel, 0L);
                ConfigurationChanged();
                UpdateMaxScreensRB(hDlg);
                }
            }
        else if (wParam == ID_VALIDATE)
            {
            CheckConfig(hDlg, TRUE);
            }
        else
            return FALSE;
        break; /* WM_COMMAND */

    case WM_DBDLGPAINT:
        {
        DB_RolodexDrawCard(hDlg);
        break;
        }

    case WM_DBENABLEROLODEXITEM:
        if (lParam != NULL)
            *(BOOL FAR *)lParam = TRUE;
        break;

    case WM_DBGETROLODEXITEM:
        {
        if (wParam == ID_CONFIGGENERAL_CC)
            LoadString(ghInst, ST_PREF_GENERAL, (LPSTR)lParam, DB_MAX_ROLODEXITEM)
                                                                                   ;
        else if (wParam == ID_CONFIGHOTKEYS_CC)
            LoadString(ghInst, ST_PREF_HOTKEYS, (LPSTR)lParam, DB_MAX_ROLODEXITEM)
                                                                                   ;
        else
            LoadString(ghInst, ST_PREF_STICKY, (LPSTR)lParam, DB_MAX_ROLODEXITEM);
        break;
```

Page 30

```
        }

    case WM_DBROLODEXSELECT:
        {
        int oldPref;
        int num;
        HDWP hDefer;

        oldPref = gCurrentPref;
        gCurrentPref = (int)[illegible];
        num = NumConfigControls(oldPref) + NumConfigControls(gCurrentPref);
        hDefer = BeginDeferWindowPos(num);
        if (hDefer != NULL)
           {
           hDefer = [illegible]Group(hDlg, oldPref, hDefer, SW_HIDE);
           if (hDefer == NULL) break;

           [illegible]lg, gCurrent[illegible], hDefer, [illegible]);
           if ([illegible]);

           EndDeferWindowPos(hDefer);
           }
        break;
        }

    case WM_DRAWITEM:
        DB_RolodexDrawItem(hDlg, (LPDRAWITEMSTRUCT)lParam);
        break;

    case WM_MEASUREITEM:
        return FALSE;
        break;

    case WM_DESTROY:
        {
        int i;

        for (i = 0; i < MAX_SCREENS; ++i)
           HK_SubClassHotKey(hDlg, ID_HOTKEYSO_EB+i, FALSE);

        DB_RolodexTerm(hDlg);

        ghWndModeless = NULL;

        break;
        }

   default:
      if (message == (WORD)gHelpMsg)
         PostMessage(ghWndDashboard, WM_DISPLAYHELP, 0, HELP_BROWSEDLG);
      return FALSE;
   }
return TRUE;
}

/*****************************************************************************
   WriteLayout
 *****************************************************************************/
BOOL FAR PASCAL WriteLayout(LPSTR layoutName, HWND hLB, HWND hDlg)
{
```

SCREENS.C, Fri 06/25/93 05:27 pm Page 31

```
int i;
LPLAYOUTARRAY lpLayoutArray;
int layout;

if (ghLayoutArray == NULL) return FALSE;

lpLayoutArray = (LPLAYOUTARRAY)GlobalLock(ghLayoutArray);
if (lpLayoutArray == NULL) return FALSE;

if (lstrlen(layoutName) <= 0)
   return FALSE;

[illegible]layout(layoutName, &gLayoutList[0], gNumLayouts);

if (layout != -1)    /* Layout already exists */
   {
   if ([illegible]Prompt(hDlg, layoutName) != IDYES)
      {
      GlobalUnlock(ghLayoutArray);
      return FALSE;
      }
   else
      {
      GlobalFree(gLayoutList[layout].hLayout);
      gLayoutList[layout].hLayout = NULL;
      }
   }
else
   /* Create a new layout */
   {
   if (gNumLayouts >= MAX_LAYOUTS)
      {
      EP_DisplayError(ghWndDashboard, ghInst, ERR_MAXLAYOUTS, ST_SCREENSPREFIX,
         MB_APPLMODAL | MB_ICONEXCLAMATION | MB_OK);
      GlobalUnlock(ghLayoutArray);
      return FALSE;
      }
   layout = gNumLayouts;
   ++gNumLayouts;
   lstrcpy(gLayoutList[layout].layoutName, layoutName);
   }

for (i = 0; i < lpLayoutArray->numTasks; ++i)
   {
   /* Make the rectange relative to the middle space (idSpace[0]) */
   if (HORIZONTAL)
      OffsetRect(&lpLayoutArray->layout[i].rect,
         (SpaceOffset(lpLayoutArray->layout[i].iSpace) - SpaceOffset(iCurrentSpa
                                                                   ce))*SX, 0);
   else
      OffsetRect(&lpLayoutArray->layout[i].rect,
         0, (SpaceOffset(lpLayoutArray->layout[i].iSpace) -
                                          SpaceOffset(iCurrentSpace))*SY);
   }

   GlobalUnlock(ghLayoutArray);
   gLayoutList[layout].hLayout = ghLayoutArray;

   /* Startup Layouts 2.0 */
   gLayoutList[layout].startup = IsDlgButtonChecked(hDlg, ID_STARTUP_CB);
```

SCREENS.C, Fri 06/25/93 05:27 pm Page 32

```
   return TRUE;
}

/*************************************************************************
   LoadLayout
      Will load the applications for "layout" (an index into gLayoutList).
 *************************************************************************/
BOOL FAR PASCAL LoadLayout(int layout)
{
int i;
int xOffset, yOffset;
int oldNum[illegible];
int cmdShow, moveSize;
int space;
[illegible]
[illegible]
[illegible]
HCURSOR [illegible];
HCURSOR [illegible];
TASKARRAY tempTaskInfo;
LPLAYOUTARRAY lpLayoutArray;
BYTE commandLine[MAXFILEPATH + MAXFILEPATH + 1];
HINSTANCE hInst;
HDWP hDWP;

lpLayoutArray = (LPLAYOUTARRAY)GlobalLock(gLayoutList[layout].hLayout);
if (lpLayoutArray == NULL) return FALSE;

if (lpLayoutArray->numScreens > gConfig.numScreens)
   {
   if (LayoutScreensPrompt() != IDOK)
      {
      GlobalUnlock(gLayoutList[layout].hLayout);
      return FALSE;
      }
   }

hHourGlass = LoadCursor(NULL, IDC_WAIT);
if (hHourGlass != NULL)
   hPreviousCursor = SetCursor(hHourGlass);

hOldWindowList = GetWindowList(&oldNumWindows);

//UpdateWindow(ghWndDashboard);
//LockWindowUpdate(GetDesktopWindow());

gDontSwitch = TRUE;

hDWP = BeginDeferWindowPos(lpLayoutArray->numTasks);
if (hDWP != NULL)
   {
   for (i = 0; i < lpLayoutArray->numTasks; ++i)
      {
      lstrcpy(commandLine, lpLayoutArray->layout[i].commandLine);
      lstrcat(commandLine, " ");
      lstrcat(commandLine, lpLayoutArray->layout[i].parameters);

      if (lpLayoutArray->layout[i].state & WS_MINIMIZE)
         cmdShow = SW_SHOWMINNOACTIVE;
```

```
      else if (lpLayoutArray->layout[i].state & WS_MAXIMIZE)
         cmdShow = SW_SHOWMAXIMIZED;
      else
         cmdShow = SW_SHOWNORMAL;

      space = TranslateSpace(lpLayoutArray->layout[i].iSpace, gConfig.numScreens
                                                   , lpLayoutArray->numScreens);

      hInst = RKExec(commandLine,
                     lpLayoutArray->layout[i].workingDir,
                     cmdShow,
                     ghWndDashboard, NULL, TRUE);

      hNewWindowList = GetWindowList(&newNumWindows);

      newhWnd = FindNewWindow(hNewWindowList, newNumWindows,
                              [illegible],
                              [illegible]);

      /* If we couldn't find a new window of the given class, look for */
      /* ANY new window.                                               */
      if (newhWnd == NULL)
         newhWnd = FindNewWindow(hNewWindowList, newNumWindows,
                                 hOldWindowList, oldNumWindows,
                                 lpLayoutArray->layout[i].className);

      if (newhWnd != NULL)
         {
         if (cmdShow == SW_SHOWNORMAL)
            newRect = lpLayoutArray->layout[i].rect;
         else
            GetWindowRect(newhWnd, &newRect);

         /* Map rects to fit within the current number of screens */
         if (space < 0)
            space = 0;
         if (space > gConfig.numScreens - 1)
            space = gConfig.numScreens - 1;

         /* 2.0                                                   */
         /* Get a temp taskInfo to find out if the new hWnd is sticky */
         /* ...might be a better way to do this.                  */
         InitTaskInfo(tempTaskInfo);
         GetTaskInfo(&tempTaskInfo, newhWnd);
         if (tempTaskInfo.bSticky)
            moveSize = SWP_NOMOVE | SWP_NOZORDER | SWP_NOACTIVATE;
         else
            moveSize = SWP_NOZORDER | SWP_NOACTIVATE;

         /* If the app is minimized or maximized, we still move it the the */
         /* correct screen, but the rect that it opens with should stay    */
         /* the same so use SWP_NOSIZE on the move.                        */
         if (cmdShow != SW_SHOWNORMAL)
            moveSize = moveSize & SWP_NOSIZE;

         FreeTaskBitmap(&tempTaskInfo);

         if (lstrcmp(lpLayoutArray->layout[i].className, CLASSNAME_NDW) == 0)
            {
            if (cmdShow == SW_SHOWMINIMIZED)
```

```
            SendMessage(newhWnd, WM_SYSCOMMAND, SC_MINIMIZE, 0L);
         }
      else if (cmdShow == SW_SHOWNORMAL)
         {
         if (IsZoomed(newhWnd))
            SendMessage(newhWnd, WM_SYSCOMMAND, SC_RESTORE, 0L);
   /* problem with dos apps......................
         else
            {
            GetClassName(newhWnd, className, sizeof(className));
            if (lstrcmp(className, CLASSNAME_DOS) == 0)
               SendMessage(newhWnd, WM_SYSCOMMAND, [illegible], 0L);
   [illegible]
   */
            [illegible]
         }
      else
         {
            xOffset = 0;
            yOffset = (SpaceOffset(iCurrentSpace) - SpaceOffset(space)) * SY;
            }
         OffsetRect(&newRect, xOffset, yOffset);
         if (hDWP != NULL)
            hDWP = DeferWindowPos(hDWP,
                                  newhWnd,
                                  NULL,
                                  newRect.left,
                                  newRect.top,
                                  newRect.right - newRect.left,
                                  newRect.bottom - newRect.top,
                                  moveSize);
         MoveOwnedPopups(newhWnd, xOffset, yOffset);
         }
      else if (cmdShow != SW_SHOWNORMAL)
         {
         if (cmdShow == SW_SHOWMAXIMIZED)
            {
            LONG l;
            l = GetWindowLong(newhWnd, GWL_STYLE);
            if (!(l & WS_MAXIMIZEBOX))
               SendMessage(newhWnd, WM_SYSCOMMAND, SC_RESTORE, 0L);
            else
               {
               /* If we are openning the app maximized, and it's still not */
               /* maximized, try sending a SC_MAXIMIZE (this happens with  */
               /* HP's appt book.                                          */
               if (!IsZoomed(newhWnd))
                  SendMessage(newhWnd, WM_SYSCOMMAND, SC_MAXIMIZE, 0L);
               }
            }

         GetWindowRect(newhWnd, &newRect);
         if (HORIZONTAL)
            {
            xOffset = (SpaceOffset(iCurrentSpace) - SpaceOffset(space)) * SX;
            yOffset = 0;
            }
         else
            {
            xOffset = 0;
            yOffset = (SpaceOffset(iCurrentSpace) - SpaceOffset(space)) * SY;
            }
         OffsetRect(&newRect, xOffset, yOffset);
         if (hDWP != NULL)
            hDWP = DeferWindowPos(hDWP,
                                  newhWnd,
                                  NULL,
                                  newRect.left,
                                  [illegible],
                                  newRect.right - newRect.left,
                                  newRect.bottom - newRect.top,
                                  [illegible]);
         [illegible])
            [illegible] newhWnd, [illegible]);
         [illegible])
            [illegible] (newhWnd, [illegible], yOffset);
         }

      if (lstrcmp(lpLayoutArray->layout[i].className, CLASSNAME_NWDT) == 0)
         /* The NewWave desktop doesn't paint consistently when loaded. */
         InvalidateRect(newhWnd, NULL, TRUE);

      if (lstrcmp(lpLayoutArray->layout[i].className, CLASSNAME_DOS) == 0)
         PostScreensMsg(WM_TASKMOVE, newhWnd, 0L);

      } /* if newhWnd != NULL */
   else
      {
      if (hInst >= HINSTANCE_ERROR)
         PostScreensMsg(WM_MOVEAPP, space, (LONG)hInst);
      }
   GlobalFree(hOldWindowList);
   hOldWindowList = hNewWindowList;
   oldNumWindows = newNumWindows;
   } /* for numTasks */
} /* if hDWP != NULL */

if (hDWP != NULL)
   EndDeferWindowPos(hDWP);

GlobalFree(hOldWindowList);

GlobalUnlock(gLayoutList[layout].hLayout);

if (hPreviousCursor != NULL)
   SetCursor(hPreviousCursor);

SetFocus(ghWndDashboard);

//LockWindowUpdate(NULL);
//UpdateWindow(GetDesktopWindow());
return TRUE;
}

/*****************************************************************************
   AddStickyApp
```

```
      Will realloc the Sticky App array (ghStickyApps) to fit the new
      sticky app given by "hWndSticky" and will add it the the end of the
      list.
 *************************************************************************/
BOOL NEAR PASCAL AddStickyApp(HWND hWndSticky)
{
LPTASKARRAY lpTaskArray;
LPSTICKYAPPINFO lpStickyApps;
int i;
DWORD size;
BOOL ret = FALSE;

[illegible]
   return FALSE;
[illegible]
[illegible]
   return FALSE;
[illegible]
[illegible] hWndSticky);

if (i < gNumTasks)
   {
   ++gConfig.numStickyApps;
   size = CalcConfigSize();
   if (size > MAXMEMSIZE)
      {
      ER_DisplayError(ghWndDashboard, ghInst, ERR_64K, ST_SCREENSPREFIX,
                      ER_TYPE_STD);
      }
   else
      {
      ghStickyApps = GlobalReAlloc(ghStickyApps, size, GMEM_MOVEABLE);
      if (ghStickyApps != NULL)
         {
         lpStickyApps = (LPSTICKYAPPINFO)GlobalLock(ghStickyApps);
         if (lpStickyApps != NULL)
            {
            lstrcpy(lpStickyApps[gConfig.numStickyApps - 1].stickyClassName,
                    lpTaskArray[i].className);
            lstrcpy(lpStickyApps[gConfig.numStickyApps - 1].stickyTitle,
                    lpTaskArray[i].szLilTitle);
            GlobalUnlock(ghStickyApps);
            ret = TRUE;
            }
         }
      }
   }
GlobalUnlock(ghTaskArray);
return ret;
}

/*************************************************************************
   ResetSticky
      Will check all tasks in ghTaskArray and set the "bSticky" field.
 *************************************************************************/
VOID FAR PASCAL ResetSticky(VOID)
{
int i;
LPTASKARRAY lpTaskArray;
```

```

if (ghTaskArray == NULL) return;

lpTaskArray = (LPTASKARRAY)GlobalLock(ghTaskArray);
if (lpTaskArray != NULL)
   {
   for (i = 0; i < gNumTasks; ++i)
      lpTaskArray[i].bSticky = IsAStickyApp(&lpTaskArray[i]);
   GlobalUnlock(ghTaskArray);
   }
}

 *************************************************************************
   [illegible]
      Return [illegible] should be moved when switching screens.
 *************************************************************************/
[illegible](LPTASKARRAY [illegible])
{
[illegible]
   return FALSE;
[illegible]windowType == WINDOWTYPE_NOWPOPUP)
   return FALSE;
if ([illegible]Array->windowType == WINDOWTYPE_CPDT)
   return FALSE;
if ((GetParent(lpTaskArray->hWnd) == ghWndDashboard) &&
   (lstrcmp(lpTaskArray->className, CLASSNAME_ICONTITLE) == 0))
   return FALSE;
if (!IsWindowVisible(lpTaskArray->hWnd))
   return FALSE;
if (IsRectEmpty(&lpTaskArray->rect))
   return FALSE;
return TRUE;
}

/*************************************************************************
   LoadBackgrounds
      Will load the background (brush or bitmap).
      Will also alloc memory for animated backgrounds.
 *************************************************************************/
void FAR PASCAL LoadBackgrounds(void)
{
BYTE filename[MAXFILEPATH + 1];

DeleteBackgrounds();

if (gConfig.background == BACKGROUND_TYPE_WIN)
   {
   if (GetWindowBackgroundFilename(filename))
      if (ReadDIB(filename, SCALINGFACTOR_WIN))
         return;

   ghWinBackgroundBrush = CreateWindowsPatternBrush();
   if (ghWinBackgroundBrush == NULL)
      ghWinBackgroundBrush = CreateSolidBrush(GetSysColor(COLOR_BACKGROUND));
   }
else if (gConfig.background == BACKGROUND_TYPE_FILE)
   {
   ReadDIB(gConfig.bitmap, SCALINGFACTOR_FILE);
   }
else if (BackgroundIsABitmap(gConfig.background))
```

```
    {
    hBackgroundBM1 = LoadBackgroundBitmap(gConfig.background, TRUE);
    hBackgroundBM2 = LoadBackgroundBitmap(gConfig.background, FALSE);
    }
else if (BackgroundIsAnimated(gConfig.background))
    {
    hBackgroundBM1 = LoadBackgroundBitmap(gConfig.background, TRUE);
    hBackgroundBM2 = LoadBackgroundBitmap(gConfig.background, FALSE);
    ghAnimMem = ... (GHND, AnimatedBackgroundMemSize(gConfig.background));
    if (ghAnimMem != NULL)
        InitAnimMem(ghAnimMem, gConfig.background);
    }

    {
    ...Brush(gConfig.background, TRUE);
    ...Brush(gConfig.background, FALSE);
    }
}

/*************************************************************************
    Check ...
        ... dialog box fields, and set gConfigError
        if any are invalid.
*************************************************************************/
VOID NEAR PASCAL CheckConfig(HWND hDlg, BOOL displayError)
{
char filename[MAXFILEPATH + 1];
OFSTRUCT of;

if (IsDlgButtonChecked(hDlg, ID_BACKGROUNDFILE_RB))
    {
    gConfigError = ERR_BACKGROUNDFILE;
    if (GetDlgItemText(hDlg, ID_BACKGROUNDFILE_EB, filename, sizeof(filename)) >
                                                                            0)
        {
        if (OpenFile(filename, &of, OF_EXIST) != HFILE_ERROR)
            {
            lstrcpy(gConfig.bitmap, filename);
            LoadBackgrounds();
            gConfigError = NULL;
            InvalidateSpaceRect(NULL, TRUE);
            }
        }
    else
        gConfigError = ERR_BACKGROUNDFILE_NULL;

    if ((gConfigError != NULL) && (displayError))
        {
        if (gConfigError == ERR_BACKGROUNDFILE_NULL)
            ER_DisplayError(NULL, ghInst, ERR_BACKGROUNDFILE_NULL, ST_SCREENSPREFIX
                                                                                ,
                            MB_APPLMODAL | MB_ICONEXCLAMATION | MB_OK);
        else
            BadCommandLineError(filename, hDlg);
        SendDlgItemMessage(hDlg, ID_BACKGROUNDFILE_EB, EM_SETSEL, 0, MAKELONG(0,
                                                                        32767));
        SetFocus(GetDlgItem(hDlg, ID_BACKGROUNDFILE_EB));
        }
    }
```

```
}
```

We claim:

1. In a computing system having a display device, said display device having a single physical display region for displaying a plurality of application programs within a graphical user interface, a computer implemented method for providing said graphical user interface with a plurality of logical display regions each of which can be selected for displaying currently executing application programs at said physical display region of said display device, the method comprising the steps of:

(a) displaying an integrated dashboard graphical user interface shell;

(b) displaying first and second panel interfaces which are integrated within the graphical user interface shell, each panel interface being individually configurable by an end user and each panel interface being configurable by the end user as part of the graphical user interface shell, each panel interface displaying one or more user interface controls, said first and second panel interfaces being integrated such that each maintains a proximity relative to the other;

(c) displaying within said first panel a plurality of user-selectable screen icons, each of said user-selectable screen icons for selecting in response to user input a particular one of said plurality of logical display regions for display on said physical display region of said display device;

(d) displaying a plurality of application program icons within said second panel interface, each of said application program icons for initiating execution of, in response to user input, a particular one of said application programs which is not currently executing;

(e) receiving user input for selecting an application program icon corresponding to a desired application program and for selecting a user-selectable screen icon corresponding to a desired logical display region;

(f) in response to said user input of step (e), initiating execution of the desired application program as an executing application program in said desired logical display region; and (g) in response to receiving user input at one of said user-selectable screen icons for selecting display of said desired logical display region, displaying said executing application program in said physical display region of said display device and ceasing display of any application program which is executing in another of said logical display regions.

2. A method as in claim 1 wherein said user input of step (e) includes placing a cursor over an application program icon corresponding to a desired application program, depressing a mouse button, moving the cursor over a user-selectable screen icon corresponding to a desired logical display region and releasing the mouse button.

3. In a computer system for executing application programs, said computer system having a graphical user interface comprising a main window which displays each executing application program in a separate application window within said main window, a method for controlling display of application programs in said main window by emulating multiple separate instances of said main window, the method comprising:

(a) displaying in said main window an integrated dashboard graphical user interface shell having a plurality of screen icons, each of said screen icons corresponding to a particular instance of said main window, said graphical user interface shell also having a plurality of launch icons for launching execution of applications in response to user input, said plurality of screen icons and said plurality of launch icons being integrated such that each maintains a proximity relative to the other regardless of orientation of the graphical user interface shell;

(b) in response to receiving user input for selecting a first one of said screen icons, creating a first instance of said main window;

(c) in response to receiving user input for selecting one of said launch icons for executing a first application program which is not currently executing, displaying said first application program in an application window within said first instance of said main window;

(d) in response to receiving user input for selecting a second one of said screen icons, creating a second instance of said main window, said second instance causing said main window to cease display of said first application program;

(e) in response to receiving user input for executing a second application program, displaying said second application program in an application window within said second instance of said main window; and (f) in response to receiving user input for re-selecting said first one of said screen icons, resuming display of said first application program in an application window within said first instance of said main window, said re-selecting said first instance causing said main window to cease display of said second application program.

4. The method of claim 3, further comprising:

displaying in said main window a plurality of application program icons, each of said application program icons being selectable by a user for executing one of said application programs.

5. The method of claim 3, further comprising:

in response to receiving user input, associating a particular user input with said second instance of said main window; and upon receiving said particular user input, re-selecting said second instance of said multiple separate instances of said main window.

6. The method of claim 5, wherein said particular user input comprises a single keystroke.

7. The method of claim 3, further comprising:

in response to receiving user input, saving a particular instance of said main window as a default instance for a future session; and at the future session, restoring said particular instance of said main window by re-displaying application programs which were being displayed when said particular instance of said main window was saved.

8. The method of claim 3, further comprising:

in response to receiving user input for executing a third application program in all instances of said main window, displaying said third application program in an application window within all instances of said main window.

9. The method of claim 3, wherein step (c) for comprises:

modifying display of said first one of said screen icons to indicate display of said first application program in an application window within said first instance of said main window.

10. The method of claim 9, wherein said modifying step includes:

displaying at said first one of said screen icons a rectangle indicating relative size and position of said first application program in an application window within said first instance of said main window.

11. The method of claim 9, wherein said modifying step includes:

displaying at said first one of said screen icons a program name of said first application program for indicating which application program is being displayed within said first instance of said main window.

12. The method of claim 9, further comprising:

(g) in response to receiving user input for re-selecting said second one of said screen icons, resuming display of said second application program in an application window within said second instance of said main window, said re-selecting said second instance causing said main window to cease display of said first application program.

13. The method of claim 9, wherein said second application program continues to execute in the background when said first instance is re-selected.

14. A computer system having an improved graphical user interface, the system comprising:

a computer having a processor, a memory, and a display device, said display device having a single physical display region for displaying a plurality of application programs within a graphical user interface; and means for displaying at said display device an integrated user interface shell for assisting a user with operation of the computer by providing said graphical user interface with a plurality of logical display regions each of which can be selected for displaying currently-executing application programs at said physical display region of said display device, said means comprising:

means for displaying at least first and second panel regions integrated within said user interface shell, each panel region displaying one or more user interface controls, means for displaying within said first panel region a plurality of user-selectable screen icons, each of said user-selectable screen icons for selecting in response to user input a particular one of said plurality of logical display regions for display on said physical display region of said display device, means for displaying within said second panel region a plurality of application program icons, each of said application program icons for launching execution of, in response to user input, a particular one of said application programs which is not currently executing, and means for launching execution of a desired application program which is not currently executing into a desired logical display region in response to receiving user input for selecting an application program icon corresponding to the desired application program and for selecting a user-selectable screen icon corresponding to the desired logical display region;

wherein said integrated user interface shell comprises a dashboard-style interface shell, wherein said first and second panel regions maintain a constant relative spatial relation to one another regardless of how the dashboard-style interface shell is oriented.

15. The system of claim 14, where said means for launching execution of a desired application program into a desired logical display region comprises:

means responsive to drag-and-drop user input, said drag-and-drop user input comprising input which drags an application program icon corresponding to the desired application program from said second panel region to said first panel region and drops the application program icon so dragged onto the screen icon corresponding to the desired logical display region.

16. The system of claim 14, wherein said drag-and-drop user input comprises includes user input placing a cursor over an application program icon corresponding to the desired application program, depressing a mouse button, moving the cursor over a user-selectable screen icon corresponding to the desired logical display region, and releasing the mouse button.

17. The system of claim 14, wherein the desired application program is launched into a currently-selected logical display region when the application program icon is selected by the user without selecting a screen icon corresponding to a logical display region.

18. The system of claim 14, wherein said user input for selecting an application program icon includes depression of a button of a mouse device.

19. The system of claim 14, further comprising:

means for storing a current configuration of the graphical user interface so that the system can restore at a future session any application programs executing in the logical display regions.

20. The system of claim 19, wherein an application program which is restored at a future session is restored in a particular logical display region within which the application program had been executing when the configuration was stored.

21. The system of claim 14, further comprising:

means for receiving user input which designates the desired application program as a "sticky" application; and means, responsive to said user input which designates the desired application program as a "sticky" application, for displaying execution of the desired application program in the single physical display region regardless of which logical display region is currently selected.

22. The system of claim 14, further comprising:

feedback means for displaying in said first panel region a rectangle indicating relative size and position of each application program executing in the system.

23. The system of claim 22, wherein said feedback means further indicates a particular logical display region within which each application program executes.

24. The system of claim 14, further comprising:

means for switching logical display regions in response to user selection a user-selectable screen icon corresponding to another logical display region.

25. The system of claim 24, wherein said means for switching logical display regions includes:

means for ceasing display of any application program which is executing in said logical display region.

26. The system of claim 24, wherein said means for switching logical display regions includes:

means for continuing background execution of said desired application program when display of the program ceases as a result of the system switching the physical display region to another logical display region.

27. The system of claim 14, further comprising:

means, responsive to user input, for displaying the dashboard-style interface shell with either a horizontal or vertical orientation; and means, responsive to any change in orientation to the dashboard-style interface shell, for modifying display of said first and second panel regions so that each maintains a constant relative spatial relation to the other.

28. The system of claim 27, wherein said means for modifying display of said first and second panel regions includes:

means for modifying display size of each panel region, so that each panel region maintains a constant relative spatial relation to the other.

29. The system of claim 27, wherein said means for modifying display of said first and second panel regions includes:

means for modifying display position of each panel region, so that each panel region maintains a constant relative spatial relation to the other.

30. The system of claim 14, wherein said constant relative spatial relation includes a constant relative proximity of each panel region to the other.

31. The system of claim 14, further comprising:

means for displaying a third panel regions integrated within said user interface shell; and means for displaying within said third panel region information indicating current usage of system resources.

32. In a computer system, an improved method for providing a graphical user interface, the method comprising:

displaying a dashboard-style user interface shell comprising a plurality of distinct panel regions, including a first panel region displaying a plurality of user interface controls for assisting a user with launching execution of programs which are not currently executing and a second panel region providing the user with information about current usage of system resources, said user interface shell being user configurable such that it can be displayed at the graphical user interface with one of two separate orientations, each orientation being predominantly perpendicular to the other;

receiving user input for changing orientation of the user interface shell;

in response to the user input, changing orientation of the user interface shell from the shell's then-current orientation to a new orientation, said new orientation being predominantly perpendicular in nature to the shell's then-current orientation; and in response to said changing step, automatically updating each panel region displayed within said user interface shell such that said first and second panel regions maintain a constant proximity to one another.

33. The method of claim 32, wherein said updating step further comprises:

automatically updating each panel region displayed within said user interface shell such that said first and second panel regions maintain a particular spatial relation to one another.

34. The method of claim 33, wherein said updating step comprises:

automatically updating a position and a size for each panel region displayed within said user interface shell such that said first and second panel regions maintain a particular spatial relation to one another.

35. The method of claim 32, wherein said user interface shell comprises third panel region, and wherein said updating step includes:

automatically updating each panel region displayed within said user interface shell such that said first, second, and third panel regions maintain a constant proximity to each other.

36. The method of claim 32, wherein said two separate orientations comprise horizontal and vertical orientations.

37. The method of claim 36, further comprising:

displaying said user interface shell at a position along a selected one of a top edge and a bottom edge of the graphical user interface, when the user interface shell is displayed with a horizontal orientation.

38. The method of claim 36, further comprising:

displaying said user interface shell at a position along a selected one of a left edge and a right edge of the graphical user interface, when the user interface shell is displayed with a vertical orientation.

* * * * *